(12) United States Patent
Johnsson et al.

(10) Patent No.: US 9,860,146 B2
(45) Date of Patent: Jan. 2, 2018

(54) METHOD AND APPARATUS FOR ESTIMATING AVAILABLE CAPACITY OF A DATA TRANSFER PATH

(71) Applicant: Telefonaktiebolaget L M Ericsson (publ), Stockholm (SE)

(72) Inventors: Andreas Johnsson, Uppsala (SE); Christofer Flinta, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 48 days.

(21) Appl. No.: 14/409,934

(22) PCT Filed: Jun. 27, 2013

(86) PCT No.: PCT/EP2013/063520
§ 371 (c)(1),
(2) Date: Dec. 19, 2014

(87) PCT Pub. No.: WO2014/001458
PCT Pub. Date: Jan. 3, 2014

(65) Prior Publication Data
US 2015/0146560 A1 May 28, 2015

Related U.S. Application Data

(60) Provisional application No. 61/664,846, filed on Jun. 27, 2012.

(51) Int. Cl.
*H04L 12/16* (2006.01)
*H04L 12/26* (2006.01)

(52) U.S. Cl.
CPC ................. *H04L 43/0882* (2013.01)

(58) Field of Classification Search
None
See application file for complete search history.

(56) References Cited

U.S. PATENT DOCUMENTS 7,180,858 B1 * 2/2007 Roy ..................... H04L 12/2697
370/229
7,778,179 B2 8/2010 Ekelin et al.
(Continued)

FOREIGN PATENT DOCUMENTS

WO 2007129134 A1 11/2007
WO 2009118602 A2 10/2009

OTHER PUBLICATIONS

Baillargeon, S. et al., "TWAMP Value-Added Octets draft-ietf-ippm-twamp-value-added-octets-00.txt", Internet Engineering Task Force, Network Working Group, Internet Draft, Feb. 8, 2012, 1-17.
(Continued)

*Primary Examiner* — Huy D Vu
*Assistant Examiner* — James P Duffy
(74) *Attorney, Agent, or Firm* — Murphy, Bilak & Homiller, PLLC

(57) ABSTRACT

A method and apparatus for estimating available capacity of a data transfer path (16) that transfers data between data communication nodes (12, 14) of a data communication system (10). The method comprising: receiving (305) probe packets (15) that traverse the data transfer path (16) during real-time operation of the data transfer path (16); providing (310) measured data ($z_U$, $z_E$) indicating strain of the received probe packets for use in estimating the available capacity of the data transfer path (16); classifying (320) the measured data based on the strain of the received probe packets; filtering (325) the classified measured data into a discrete representation of a probability density function of available capacity; and estimating (330) the available capacity by using the discrete representation of the probability density function.

24 Claims, 14 Drawing Sheets

(56) References Cited

U.S. PATENT DOCUMENTS

| | | | |
|---|---|---|---|
| 8,503,320 B2 | 8/2013 | Ekelin et al. | |
| 2002/0116154 A1* | 8/2002 | Nowak | H04L 12/2697 702/186 |
| 2005/0237929 A1* | 10/2005 | Leith | H04L 47/10 370/229 |
| 2007/0115849 A1* | 5/2007 | Ekelin | H04L 12/2697 370/252 |
| 2011/0149751 A1* | 6/2011 | Li | H04L 41/147 370/252 |
| 2012/0196261 A1* | 8/2012 | Kim | G09B 7/02 434/322 |
| 2013/0198740 A1* | 8/2013 | Arroyo | H04L 41/0806 718/1 |

OTHER PUBLICATIONS

Bechtel, Mark et al., "Available Bandwidth Measurements in QoS Environments", Master of Science Thesis, KTH The Royal Institute of Technology School of Technology and Health, 2010, 1-133.

Bergfeldt, Erik, "Available-Bandwidth Estimation in Packet-Switched Communication Networks", Linköping Studies in Science and Technology. Dissertations, No. 1348, 2010, 1-186.

Chimento, P. et al., "Defining Network Capacity", Internet Engineering Task Force, Network Working Group, Request for Comments: 5136, Feb. 2008, 1-14.

Croce, Daniele et al., "Large-Scale Available Bandwidth Measurements: Shortcomings of Current Techniques", IEEE Transactions on Network and Service Management, vol. 8, No. 4, Dec. 2011, 1-15.

Doucet, Arnaud, "A Tutorial on Particle Filtering and Smoothing: Fifteen years later", Technical report, Department of Statistics, University of British Columbia, Dec. 2008, 1-39.

Ekelin, Svante et al., "Real-Time Measurement of End-to-End Available Bandwidth using Kalman Filtering", Proceedings to the 10th IEEE/IFIP Network Operations and Management Symposium, Vancouver, Canada, Apr. 2006, 1-12.

Hedayat, K. et al., "A Two-Way Active Measurement Protocol (TWAMP)", Internet Engineering Task Force, Network Working Group, Request for Comments 5357, Oct. 2008, 1-26.

Jain, Manish et al., "Pathload: a measurement tool for end-to-end available bandwidth", in Proc. Passive and Active Measurement workshop (PAM), 2002, 1-12.

Melander, Bob et al., "Probing-Based Approaches to Bandwidth Measurements and Network Path Emulation", PhD Thesis, Uppsala University, 2003, 1-191.

Prasad, et al., "Bandwidth estimation: metrics, measurement techniques, and tools", IEEE Network, Nov./Dec. 2003, 1-12.

Ribeiro, Vinay J. et al., "pathChirp: Efficient Available Bandwidth Estimation for Network Paths", in Proc. Passive and Active Measurement workshop (PAM), 2003, 1-11.

Shalunov, S. et al., "A One-way Active Measurement Protocol (OWAMP)", Internet Engineering Task Force, Request for Comments: 4656, Sep. 2006, 1-56.

Unknown, Author, "Internet protocol data communication service—IP packet transfer and availability performance parameters", International Telecommunication Union, Series Y: Global Information Infrastructure, Internet Protocol Aspects and Next-Generation Networks, Mar. 2011, 1-52.

Bergfeldt, Erik et al., "Real-time available-bandwidth estimation using filtering and change detection", Computer Networks 53, 2009, 2617-2645.

Hu, Chao, "A multiscale framework with extended Kalman filter for lithium-ion battery SOC and capacity estimation", Applied Energy 92, 2012, 694-704.

Peng, Zhou, "Implementation of Optimal Routing Algorithms Based on Pipeline Flux Leak Monitoring Networks", IEEE 2009, International Forum on Computer Science-Technology and Applications, 263-266.

* cited by examiner

METHOD AND APPARATUS FOR ESTIMATING AVAILABLE CAPACITY OF A DATA TRANSFER PATH

TECHNICAL FIELD

The present disclosure relates generally to an apparatus and a method therein. More particularly, embodiments herein relate to estimation of available capacity of a data transfer path of a data communication system.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc. also allow the users to communicate via e-mail, video conferencing, IM, etc. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases.

To accommodate the new and different ways in which Internet Protocol (IP) networks are being used to provide various services, new active measurement techniques are being developed and standardized to verify the service performance. Knowing how much capacity is available in real-time on a path (congested or not) across one or more IP networks is valuable information to the network operators or application users. Measurements of available path capacity can be used for network characterization and application performance estimation. The capability of estimating available capacity, end-to-end, over a data transfer path of a data communication system comprising a data network is useful in several contexts, including network monitoring and server selection. Passive estimation of available capacity of a data transfer path, such as estimation of bandwidth of an end-to-end data transfer path is possible in principle, provided all network nodes in the data transfer path can be accessed. However, this is typically not possible, and estimation of available end-to-end capacity of the data transfer path, is typically done by active probing of the data transfer path. The available capacity such as bandwidth can be estimated by injecting data probes into the data transfer path, and then analysing the observed effects of cross traffic on the probes. This kind of active measurement requires access to sender and receiver hosts, typically data network nodes, only, and does not require access to any intermediate nodes in the data transfer path between the sender and receiver nodes.

Conventional approaches to active probing require the injection of data probe packet traffic into the data transfer path of interest at a rate that is sufficient transiently to use all available capacity, and cause induced transient congestion of the data transfer path being estimated. If only a small number of probe packets are used, then the induced transient congestion can be absorbed by buffer queues in the nodes. Accordingly, no data packet loss is caused, but rather only a small data path delay increase of a few data packets. The desired measure of the available capacity is determined based on the path delay increase. Probe packets can be sent in pairs or in trains, at various rates, also referred to as probing rates. The probing rate where a data path delay begins increasing corresponds to the point of congestion, and thus is indicative of the available capacity. Probe packets can also be sent such that the temporal separation between probe packets within a given probe packet train varies, so each probe packet train can cover a range of probing rates.

Methods using active probing are based on a model where probe packets are sent from a sender node to a receiver node in a data communication system. Typically, time stamps of the probe packets at the sender and receiver nodes are then used by an algorithm to produce estimates of the capacity of the data transfer path.

IP-layer performance metrics such as the Available Path Capacity (APC) have been defined in several standard bodies including the Internet Engineering Task Force (IETF) "Defining Network Capacity" Request For Comments (RFC) 5136, and International Telecommunication Union-Telecommunication (ITU-T) Recommendation Y.1540. The IP-layer APC is defined as the capacity available for others to use between a source host and destination host for a given packet type known as type-P packet corresponding to a transport protocol, port number, packet size and Diffserv Codepoint (DSCP).

The IETF IP Performance Metrics (IPPM) working group has defined two IP active measurement protocols: One-Way Active Measurement Protocol (OWAMP), RFC4656, and Two-Way Active Measurement Protocol (TWAMP), RFC5357. OWAMP is designed for measuring one-way packet delay and one-way packet loss between two hosts. TWAMP is based on OWAMP. TWAMP is designed for measuring one-way and two-way, i.e. round-trip, packet delay and packet loss between two hosts.

The basic operation of TWAMP is to let a sender node inject test packets towards a reflector node. When the reflector receives a test packet it is transmitted back to the sender node as soon as possible. Each test packet is time stamped upon transmission and arrival, both at the sender node and reflector host node, so 4 time stamps are produced for each packet.

The original TWAMP is not capable of measuring capacity metrics, such as APC on both the forward and reverse path, since capacity estimation methods need to send and receive trains, where each train is sent at a specific transmission rate in a given direction. This is resolved in IETF RFC 6802 on Ericsson TWAMP Value Added Octets. It introduces a buffering feature in the TWAMP reflector. The reflector node receives and stores all packets in a train before sending them back to the sender node as a new train with a reverse rate, which can be chosen independently of the forward rate, as illustrated in FIG. 1.

Examples of two known methods for estimating capacity of a data transfer path used today, the so-called Trains Of Packet Pairs (TOPP) and Bandwidth Available in Real Time (BART) methods will be explained in detail and how they are related to the present disclosure under section "DETAILED DESCRIPTION". The BART method can be regarded as an improvement of the TOPP method. See European Patent 1952579 for a further description of the BART method.

Some known solutions for estimating capacity of a data transfer path used today either do, in some situations, not produce real time estimates of available capacity, or do not produce sufficiently accurate estimates of the available capacity of the data transfer path, or both due to non-linear capacity behaviour of the data communication system.

SUMMARY

An object of the present disclosure is to provide an accurate estimation of the available capacity of a data transfer path in real time using active probing.

According to a first aspect the object is achieved by a method in an apparatus for estimating available capacity of a data transfer path that transfers data between data communication nodes of a data communication system. The apparatus receives probe packets that traverse the data transfer path during real-time operation of the data transfer path. The apparatus further provides measured data indicating strain of the received probe packets for use in estimating the available capacity of the data transfer path. In addition, the apparatus classifies the measured data based on the strain of the received probe packets, and filters the classified measured data into a discrete representation of a probability density function of available capacity. The apparatus then estimates the available capacity by using the discrete representation of the probability density function.

According to a second aspect the object is achieved by an apparatus for estimating available capacity of a data transfer path that transfers data between data communication nodes of a data communication system. The apparatus comprises a data production unit configured to receive probe packets that have traversed the data transfer path during real-time operation of the data transfer path. The data production unit responsive to traversal of the data transfer path by said probe packets for providing, during said real-time operation of the data transfer path, measured data indicating strain of the received probe packets for use in estimating the available capacity of the data transfer path. The apparatus further comprises a filtering unit configured to classify the measured data based on the strain of the received probe packets and to filter the classified measured data into a discrete representation of a probability density function of available capacity. The apparatus also comprises an estimation unit configured to estimate the available capacity by using the discrete representation of the probability density function.

An advantage with the above mentioned first and second aspects described is that they provide an accurate estimation of APC of a data transfer path in real time using active probing even in cases of non-linear capacity behaviour of the data communication system.

BRIEF DESCRIPTION OF THE DRAWINGS

Embodiments will now be described in more detail in relation to the enclosed drawings, in which.

DETAILED DESCRIPTION

In this disclosure throughout, conventional terms and their abbreviations that have been considered to be well-known to the skilled person have been used as much as possible for a better understanding. A list of abbreviations is also included on the last page of the description. Since they are considered to be well-known to the skilled person they are used without exhaustive definitions. Thus, only terms considered to require a more exhaustive explanation have been explained in more detail, often by means of concrete examples to assist understanding.

Herein, the term "capacity" includes "Available Path Capacity" (APC) as well as Tight Link Capacity" (TLC). These terms, per se, will be explained in more detail as follows.

Further advantages and features of embodiments of the present disclosure will become apparent when reading the following detailed description in conjunction with the drawings.

All methods for measuring capacity in particular APC and TLC, end-to-end or point-to-point over a data transfer path of a data communication system using active probing are based on a model where probe packets are sent at a rate from a sender node to a receiver node of the data communication system, e.g. using probe trains including trains of probe packet pairs. Time stamps of the probe packets at the sender and receiver node are then used to produce APC and TLC estimations. The rate of the probe packets at the sender node varies between $u_{min}$ and $u_{max}$. The rate of the probe packets at the receiver node will be lower than or equal to $u_{max}$. For each new train of probe packets the solutions described in this disclosure may utilize a particle filter to estimate the location of the breakpoint defining the rate of overload on a one-dimensional scale between $u_{min}$ and $u_{max}$. This breakpoint defines the APC.

Figure 1:
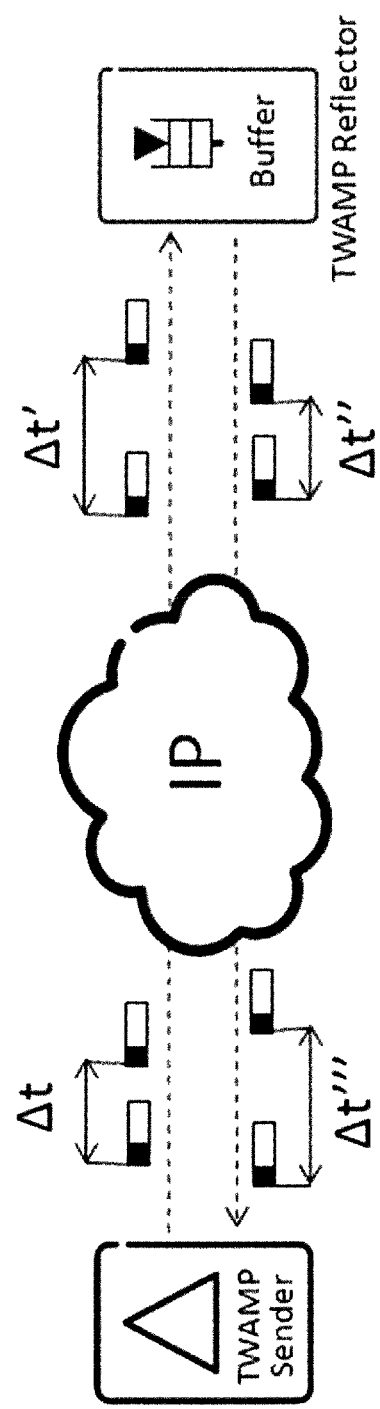
FIG. 1 is a schematic block diagram of a data transfer path of a data communication system.
Figure 2:
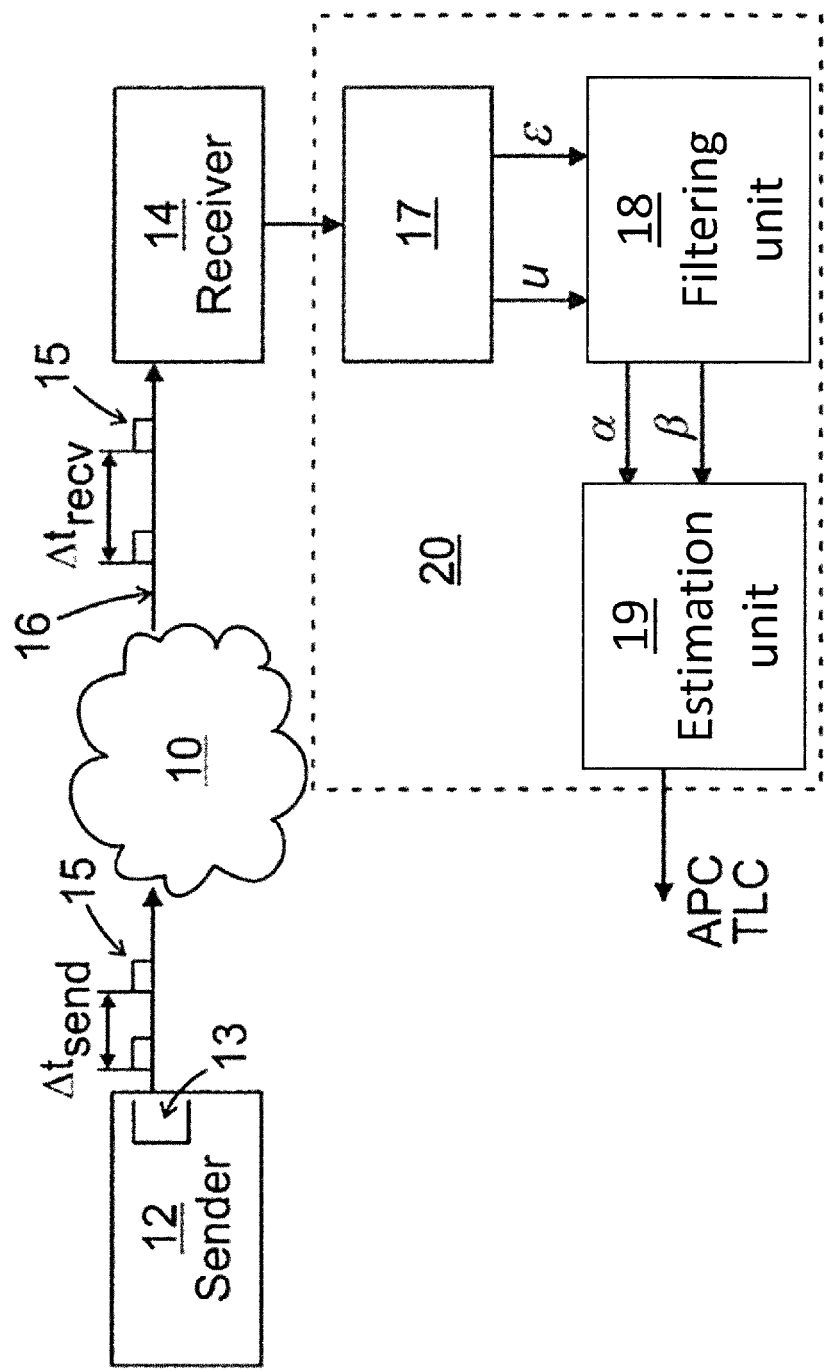
FIG. 2 is a schematic block diagram of a data transfer path of a data communication system in which embodiments of this disclosure are implemented.

Now is referred to FIG. 2 illustrating a schematic block diagram of a data communication system 10 in which embodiments of this disclosure can be implemented. The data communication system 10 comprises a data transfer path 16 that transfers data between data communication nodes 12, 14, for instance a sender node 12 and a receiver node 14. The sender node 12 transmits a train of probe packets 15 having a particular time interval $\Delta_{send}$ that traverse the data transfer path 16 during real-time operation of the data transfer path 16 to the receiver node 14, which receives the train of probe packets 15 having another particular time interval $\Delta_{recv}$ when received at the receiver node 14 because of congestion within the data communication system 10. Each train of probe packets 15 is typically sent with a different probing rate u depending on the packet size, the number of data packets per train and the time interval between the data packets. The probing rate u is defined as:

$u$=(total number of transferred bits during $\Delta_{send}$)/$\Delta_{send}$.

If the probing rate u is larger than the APC, the time interval Δrecv at the receiver node 14 will be longer than at the sender node Δsend. The relative time difference is called strain ϵ, a dimensionless quantity defined below.

As described above and illustrated in FIG. 2, to which is referred once more, probe packets 15 are provided, typically sent from the sender node 12 to the receiver node 14 in the data communication system 10. Typically, time stamps of the probe packets 15 at the sender node 12 and receiver node 14 are used to produce APC estimates, and measured data of the data transfer path 16. Once an estimate of APC is produced an estimate of TLC is easily accomplished using a linear model and data measured form samples where $z_\epsilon>0$, i.e. using the estimated value of APC and one or more values from measured data having a rate $z_u$ exceeding the estimated value of APC. Note that these values should be used only when a linear model could be expected, e.g. for rates $z_u$ very close to the APC estimate.

According to embodiments herein, the data communication system 10 further comprises an apparatus 20 for estimating available capacity such as APC of the data transfer path 16. The data communication system 10 may constitute, or form a part of, a packet-switched data communication system including a data communication system or network, such as the Internet, a private intranet, etc. Typically, the apparatus 20 is arranged to communicate with the receiver node 14 or is contained in the same receiver node 14. The apparatus 20 receives the probe packets 15 that traverse the data transfer path 16. The apparatus 20 provides or measures data, i.e. measured data, indicating strain of the received probe packets. The measured data is e.g. strain of the received probe packets and rate at the transmission of the received probe rate. The apparatus 20 then classifies the measured data based on the strain of the received probe packets. The apparatus 20 may e.g. classify the measured data based on strain in relation to a threshold value such as a noise distribution value. When classified the apparatus 20 uses the measured data in a filtering process which results in a discrete representation of a probability density function of available capacity. For example, the rate and the strain of the measured data may be used as input in a particle filter, where each particle is represented by a weight and a rate, from that input measured data a representation value is obtained, which value is indicating a certain rate value. The apparatus 20 then estimates the available capacity by using the discrete representation of the probability density function, e.g. the certain rate value indicating the available capacity. As the available capacity is estimated on measured values and not from an estimated function from measured values, the apparatus 20 responds to changes of the available capacity in a swift manner and is able to estimate an accurate available capacity also when the system shows a non-linear strain.

The apparatus 20 comprises a data production unit 17 arranged to receive the probe packets 15 that have traversed the data transfer path 16 during real-time operation of the data transfer path 16. The data production unit 17 is responsive to traversal of the data transfer path 16 by the probe packets 15 for providing typically producing, during said real-time operation of the data transfer path 16, measured data such as rate u, and strain $z_\epsilon$ for use in estimating the APC of the data transfer path 16. The aforementioned time stamping at the sender and receiver nodes 12, 14 are not explicitly shown. The data production unit 17 may be configured to extract the time stamp information and the probing rate $z_u$ from the probe packets 15. The data production unit 17, which may comprise a strain $z_\epsilon$ calculator, calculates the strain $z_\epsilon$, also referred to as inter-packet strain value of each train of probe packets 15 in the received sequence of probe packets 15, and also calculates the average and variance of the strain $z_\epsilon$.

The apparatus 20 further comprises an estimation unit 19 arranged to communicate with the data production unit 17 for producing an estimate of the APC during said real-time operation of the data transfer path 16. The estimation unit 19 is connected to, or includes, a filtering unit 18 such as a particle filter and is arranged to estimate the APC of the data transfer path 16 based on the outcome of the filter.

According to an embodiment, the data production unit 17 can, as an example, be regarded as comprising a probe packet extractor and strain calculator that ultimately produces measured data $z_u$, $z_\epsilon$ for use in estimating the APC of the data transfer path, by means of the estimation unit 19. The APC of the data transfer path 16 are sampled by transmitting probe packets 15 in a specific pattern across the data transfer path 16. Their time stamps are recorded on sending and on receiving, providing a measurement of a quantity related to the network model variables. This is repeated over and over again, for as long as it is desired to estimate the APC of the data transfer path 16.

Typically, the sender node 12 sends a train of R probe packets 15 with probing rate $z_u$. The R probe packets are used by the apparatus 20 for measurement of strain $z_\epsilon$. Some embodiments send a sequence of R+1 probe packets that are used to form R pairs of probe packets. That is, the second probe packet of the first pair is also used as the first probe packet of the second pair, and so on. In some embodiments, probe packets are not shared among the probe packet pairs, so a sequence of 2 R probe packets is used to form R distinct pairs of probe packets.

In the embodiments illustrated and described, all of the components 17, 18, 19 are provided as contained in the receiver node 14, but may also be provided externally of and separate from the receiver node 14, for example, in one or more other nodes of the data communication system 10.

The method and apparatus of the present disclosure can produce an updated estimate of APC for each new sampling of the data communication system, i.e. for each new train of probe packets. The trains may be sent arbitrarily often, i.e., the time scale for the sampling measurement can be reduced arbitrarily, so the available capacity such as the bandwidth of the data transfer path may be tracked in real time.

Data processing and memory requirements for performing the above-described embodiments can be met relatively easily. For example, in some embodiments the receiver node 14 of FIG. 2 is a microprocessor platform into which the embodiments of the apparatus 20 can be provided. Alternatively, the apparatus 20 may also be configured by processing circuitry, for instance containing a processor and corresponding memory configured to perform the method according to the various embodiments described herein.

Two known methods, namely the TOPP and BART methods will be described for a better understanding of the underlying principles of the embodiments of this disclosure.

The TOPP method defines the strain ϵ as:

$$\varepsilon = \frac{\Delta_{recv}}{\Delta_{send}} \qquad (\text{eq. 1})$$

while the BART method defines the strain ϵ as:

$$\varepsilon = \frac{\Delta_{recv} - \Delta_{send}}{\Delta_{send}} \quad (eq.\ 2)$$

In this disclosure, the strain definition from the BART method, i.e. a normalized difference between a time interval of probe packets at a send rate, and a time interval of the probe packets at a received rate, will be used as follows, but without any limitations to this particular definition. Other strain definitions such as the strain definition from the TOPP method may of course be used instead.

In a data communication system with queue forwarding based on a first-come-first-served policy, the strain will increase linearly with the probing rate when the probing rate is larger than the APC. Now is also referred to FIG. 3 graphically illustrating a model utilized by exemplary embodiments of the present disclosure for estimating APC, as well as by the known TOPP and BART methods. The probing rate is defined along a horizontal axis and the strain is defined along a vertical axis. In the data communications system 10, such as a network, with forwarding nodes, for instance the sender and receiver node 12, 14, based on a first-come-first-served policy such as illustrated and described in FIG. 2, the strain ϵ will increase linearly in a sloping part $\epsilon = \alpha + \beta * u$ with the probing rate u when the probing rate u is larger than the APC, which is indicated with an arrow. 'α' and 'β' are set parameters. APC and TLC are estimated as:

$$TLC = 1/\beta \quad (eq.\ 3)$$

$$APC = -\alpha/\beta \quad (eq.\ 4)$$

Figure 3:
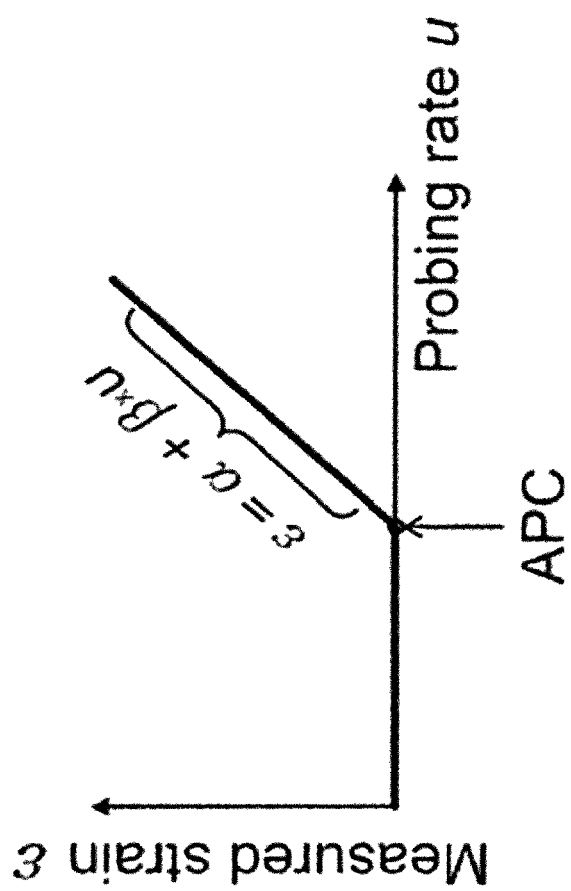
FIG. 3 graphically illustrates a piecewise linear model utilized by exemplary embodiments of the present disclosure.

Description of the known TOPP and BART methods:

The known TOPP method uses a linear regression method in the sloping part $\epsilon = \alpha + \beta * u$ of the strain-probing rate diagram of FIG. 3 in order to estimate the APC and TLC for the data transfer path 16 of FIG. 2. In its basic form the TOPP method collects data from a number of trains of probe packets and makes an estimate for the whole collection of data.

The BART method can be regarded as an improvement of the TOPP method, where a Kalman filter is used instead of the linear regression method. The Kalman filter makes it possible to get a new estimate for each new data point, while at the same time only keeping a minimum of information stored in a memory. The size of the stored information or data is constant and independent of a time scale of the estimates.

Another feature of BART is that the Kalman filter tends to stabilize the estimates around constant levels. As an example the TLC may be constant in a network. The Kalman filter will then let a TLC estimate converge towards that value and then slowly fluctuate around it. Also new methods have been introduced, e.g. a change detection of system state.

The TOPP method normally collects data from a large number of trains of probe packets for each estimate. In order to produce a new estimate a new collection is therefore needed which takes time and needs memory storage proportional to the number of data points.

According to embodiments disclosed herein a filter-based estimation is provided, wherein the filter tracks a system state of interest, i.e. the available capacity, by repeated sampling. In this disclosure we may utilize a specific filter called the particle filter that does not require a linear model of the strain. It is assumed that the system state can be modeled as a first order Markov process such that $$a_k = g(a_{k-1}) + \omega_k \quad (eq.\ 5)$$

where $a_k$ is system state at time k, $\omega_k$ is noise with some probability density function and g(.) is an arbitrary function.

The particle filter also assumes that consecutive measurements of the system state $z_k$ are independent of each other. Further, the measurement $z_k$ is only dependent on $a_k$ such that $$z_k = h(a_k) + v_k \quad (eq.\ 6)$$

where $v_k$ is noise with some probability density function.

An important feature of the particle filter is that there are no linear requirements on neither g(.) nor h(.).

For the purpose of this disclosure, APC is modeled as the system state $a_k$ and the measurements $z_k$ corresponds to the measured data, which data is measured at time k.

A measurement z is defined by <u, ϵ> where u∈[$u_{min}$, $u_{max}$] and ϵ is modeled as $$\varepsilon = \begin{cases} 0 + r_k & u < APC \\ f(u) + r_k & u \geq APC \end{cases} \quad (eq.\ 7)$$

where f(.) is an non-zero function and $r_k$ is noise, e.g. Gaussian noise. The noise originates from one or more factors, such as measurement errors. The elements of z are denoted $z_u$=rate and $z_\epsilon$=strain.

It should be noted that in the present disclosure the terms "measurements", "measurement sample", "sample" and "measured data" are used interchangeably and refer to the same thing, namely the values of strain $z_\epsilon$ measured at the receiver node 14 for the probe packets transmitted from the sender node 12 at a rate 'u'. These may in some places be denoted c or $z_\epsilon$, and u or $z_u$, respectively.

The above relation shown in equation 7 is also used in for example the above mentioned TOPP and BART. For both these methods $f(u) = \alpha u + \beta$, which is illustrated in FIG. 3. The APC is defined as the probing rate 'u' for which ϵ starts to grow according to f(u). The interpretation of the above relation is the following; if the probing rate 'u' or probe-packet train rate is below APC the calculated ϵ will be 0, or some other constant—depending on the definition of ϵ, on average. If the probing rate 'u' is above APC the calculated ϵ will grow according to f(u) due to queuing in the network nodes between the sender node 12 and the receiver node 14. This is also referred to as self-induced congestion, see e.g. the document "Available-Bandwidth Estimation in Packet-Switched Communication Networks", Erik Bergfeldt, PhD Thesis, Linköping University, 2010, ISBN 978-91-7393-292-9.

For embodiments of the present disclosure, f(u) does not have to be linear, in fact f(.) can be any non-zero function. The benefits of this will be discussed below.

If g(.), h(.) and f(.) are linear and $\omega_k$ and $v_k$ are Gaussian, a solution using a Kalman filter as in BART provides an optimal method for tracking the system state, i.e. the available capacity. However, multiple bottlenecks in the network path may impact the linearity. In this disclosure the requirement on the three functions g(.), h(.) and f(.) are therefore relaxed and the possibilities to apply a non-linear model for APC estimation are investigated.

Figure 4:
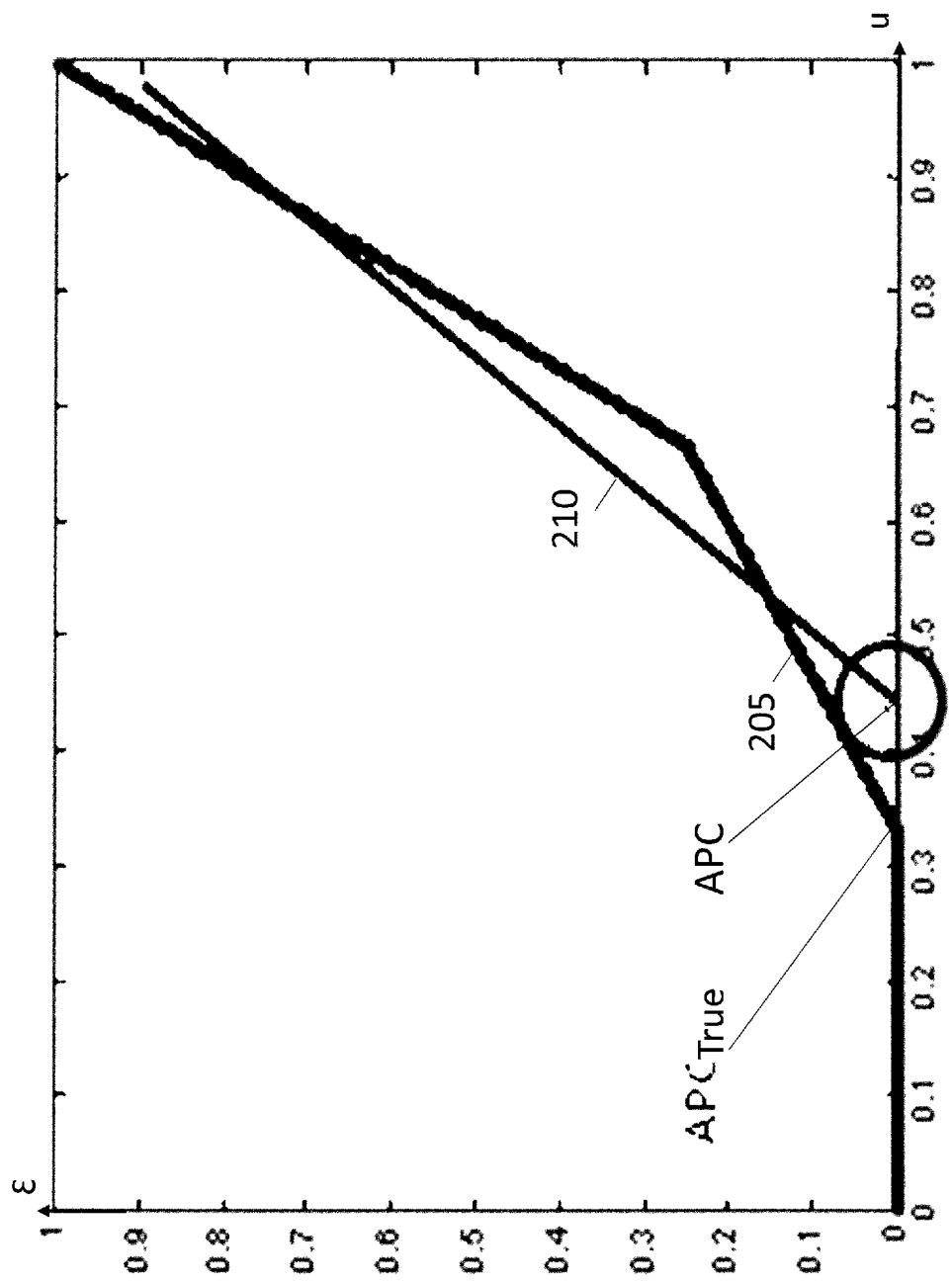
FIG. 4 graphically illustrates a piecewise linear model applied to a non-linear system.

In short, if a linear model is applied on a non-linear system, a linear assumption for ϵ may provide erroneous APC estimates. This is illustrated in FIG. 4. The probing rate is defined along a horizontal axis and the strain is defined along a vertical axis. In this case the relation between u and ϵ is a piece-wise linear curve 205. Modeling this relation with a linear model, see curve 210, for ϵ will result in the system state estimate as illustrated in the FIG. 4. The APC estimate is obtained from the intersection of the curve 210 and ϵ=0. This will thus lead to an overestimation of the APC as compared to actual APC ($APC_{True}$) in this scenario.

An objective of using a particle filter in embodiments herein is to track a system state, available capacity in this disclosure, as it evolves over time. An example of a particle filter that may be used is the Sequential Importance Resampling (SIR) method, described in "A tutorial on particle filtering and smoothing: fifteen years later" by Doucet, A.; Johansen, A. M.; (December 2008). *Technical report, Department of Statistics, University of British Columbia*. A principle of embodiments herein using SIR is to construct a discrete sample based, or just discrete, representation of a probability density function (pdf) for the system state that is tracked. Multiple copies, also referred to as particles, of the system state are used. Each one is associated with a weight that corresponds to the probability of that specific particle. An estimate of the variable of interest is obtained by calculating the weighted average of all particles. A new estimate is also obtained for each new sample. The variance is also obtained from the particles. SIR is iterative in its nature and operates in two phases; a prediction phase and an update phase. In the prediction phase each particle is updated according to some model known to govern the system state. Further, the update phase recalculates the particle weight based on the measurements of the system.

Applying SIR to available capacity estimation according to embodiments herein, a particle q is defined as a vector <u, w> where u∈[$u_{min}$, $u_{max}$] and w is the particle weight which is a normalized probability. The elements of q are denoted $q_u$ and $q_w$. Each particle q belongs to a particle set S and the number of particles in the set is denoted P. Further, a particle update function may be defined that governs relation between a measurement data and the weights of the particle. One such function is provided in Eq 9 below.

The prediction phase is modeled as $a_k=a_{k-1}+\omega_k$ for simplicity, while the update phase is based on the measurement samples.

For each received measurement sample, z, comprising a value of strain $z_\epsilon$ and a value the probing rate $z_u$, the method may work according to the following steps A-F:

Step A. Construct an initial set S of P particles with equal weight 1/P, e.g. 100 particles each having an initial weight of 0.01. The rate $q_u$ for the P particles is evenly spread in the interval [$u_{min}$, $u_{max}$].

Step B. Define a set S'={0}, i.e. S' is an empty set

Step C. For i=1, . . . , P:

Draw a particle $q_i$, where i in this case corresponds to the particle index, with replacement from the current particle set S with probability proportional to its weight $q_{i,w}$. Set $q'_i=q_i$ and add Gaussian noise to the u element of $q'_i$ (i.e. $q_{i,u}$)

Calculate a new weight $q'_{i,w}=p(z, q'_i)$ for particle $q'_i$ given sample z, add Gaussian noise to $q'_{i,w}$ Update the new particle set S', S'=union(S', {$q'_i$})

This step is thus repeated P times. Each time a particle is copied and returned to the particle set S. The copy of the particle will then be modified. Note that some particles may not necessarily be drawn, whereas other particles may be drawn a plurality of times.

Note that a particle is denoted q. A specific particle within the set S is denoted $q_i$, where i corresponds to the particle index. Each particle q is composed by two elements u and w, denoted $q_u$ and $q_w$. When referring to an element of a specific particle in the particle set we use the notation $q_{i,u}$ or $q_{i,w}$.

The function p(.) above is exemplified in the following. Each time a particle is drawn, if $z_\epsilon$ is larger than 0, it can be concluded that the APC is lower than the probing rate $z_u$. Consequently, if $z_\epsilon$ is larger than 0, the value of the weight $q_{i,w}$ will be increased for all particles $q_i$ having a value of $q_u$ being lower than the value of $z_u$. Correspondingly, the value of the weight $q_{i,w}$ will be decreased for all particles $q_i$ having a value of $q_u$ being higher than the value of $z_u$.

In the corresponding manner, if $z_\epsilon$ is equal to 0, the value of the weight $q_w$ will be decreased for all particles having a value of $q_u$ being lower than the value of $z_u$. Similarly the value of the weight $q_{i,w}$ will be increased for all particles having a value of $q_u$ being higher than the value of $z_u$.

Step D. Normalize $q'_{i,w}$ for i=1, . . . , P in S'.

Step E. Calculate a weighted average value, based on the values of $q_u$ and $q_w$ from all particles in S', the result corresponds to APC Step F. Set S=S'

The above method may then be iterated (steps B-F) for each new received measurement z. Gaussian noise may be added to each component of a particle q' in order to increase the efficiency of the method. The mean and standard deviation of the noise are configurable parameters. A high value of the Gaussian mean value results in fast tracking properties while a low mean value provides estimation stability.

One key to estimate APC by using a particle filter is to define the sample z, as done above, and to define a weight update function p(z, q).

According to one embodiment the weight of a particle is updated according to $$w_k^i = w_{k-1}^i p(z,q) \qquad \text{(eq. 8)}$$

where $$p(z,q) = \begin{cases} (1-\delta) & (z_\epsilon > 0 \wedge q_u > z_u) \vee (z_\epsilon = 0 \wedge q_u \leq z_u) \\ \delta & (z_\epsilon > 0 \wedge q_u \leq z_u) \vee (z_\epsilon = 0 \wedge q_u > z_u) \end{cases} \qquad \text{(eq. 9)}$$

where δ ∈]0.5, 1[, i is the particle index and k is the time. Note again that w is an element of a particle q. Equations 8 and 9 explain, using mathematical terms, one example of weight update described above in step C. The function is used, in combination with the normalization step D described above, to either increase or decrease the current weight of the particle. The described function p(z, q) above is just one example of how to update the weight. However, it is a simple function providing accurate estimations of APC.

A method using filtering according to the present disclosure thus classify samples in order to decide whether the strain $z_\epsilon$ of the samples is in the zero class, i.e. $z_\epsilon$=0, or in the above zero class, i.e. $z_\epsilon$>0. From Equation 7 above it is clear that samples with $z_\epsilon$ close to 0 may be classified either as 0 or above zero due to the noise factor.

In a simulation the classification is not a problem. However, applying the particle filter method for APC estimation on samples from a real network the distinction is not trivial. In this disclosure one way of accomplishing classification is described. It is therefore proposed a hypothesis testing method where each sampled strain value $z_\epsilon$ is compared to a distribution for noise. The null hypothesis is that $z_\epsilon$ is far away from the distribution mean, with respect to its standard deviation. $z_\epsilon$ would then be classified as above zero. The alternative hypothesis is that $z_\epsilon$ belongs to the noise distribution and in this case it is classified as zero.

An example of a classification method will be described in the following, using a classification model based on a Gaussian distribution N:

Initialize the model N($\gamma$, $\sigma$) and set $\gamma=0$ and $\sigma=1$, where $\gamma$ is the mean value of the Gaussian distribution N and a is its standard deviation.

The classification model N is updated according to the following: If rate $z_u$ for the sample is lower than the current estimate of APC and strain $z_\epsilon$ for the sample is lower than n$\sigma$, the sample is thus determined to be in the horizontal part of the line in e.g. FIG. 4, then perform Maximum Likelihood and fit the sample on e.g. a Gaussian distribution N($\gamma$, $\sigma$); and update N($\gamma$, $\sigma$) each time the if-statement returns true during a measurement; End.

The measurement sample is then classified according to the following:

If $z_\epsilon$<n$\sigma$, i.e. the strain for the sample is below the noise distribution the sample is classified as zero, else the sample is classified as above zero, where n is a tunable parameter.

After classification, Equation 9 above is used to update the particle weights.

Figure 5:
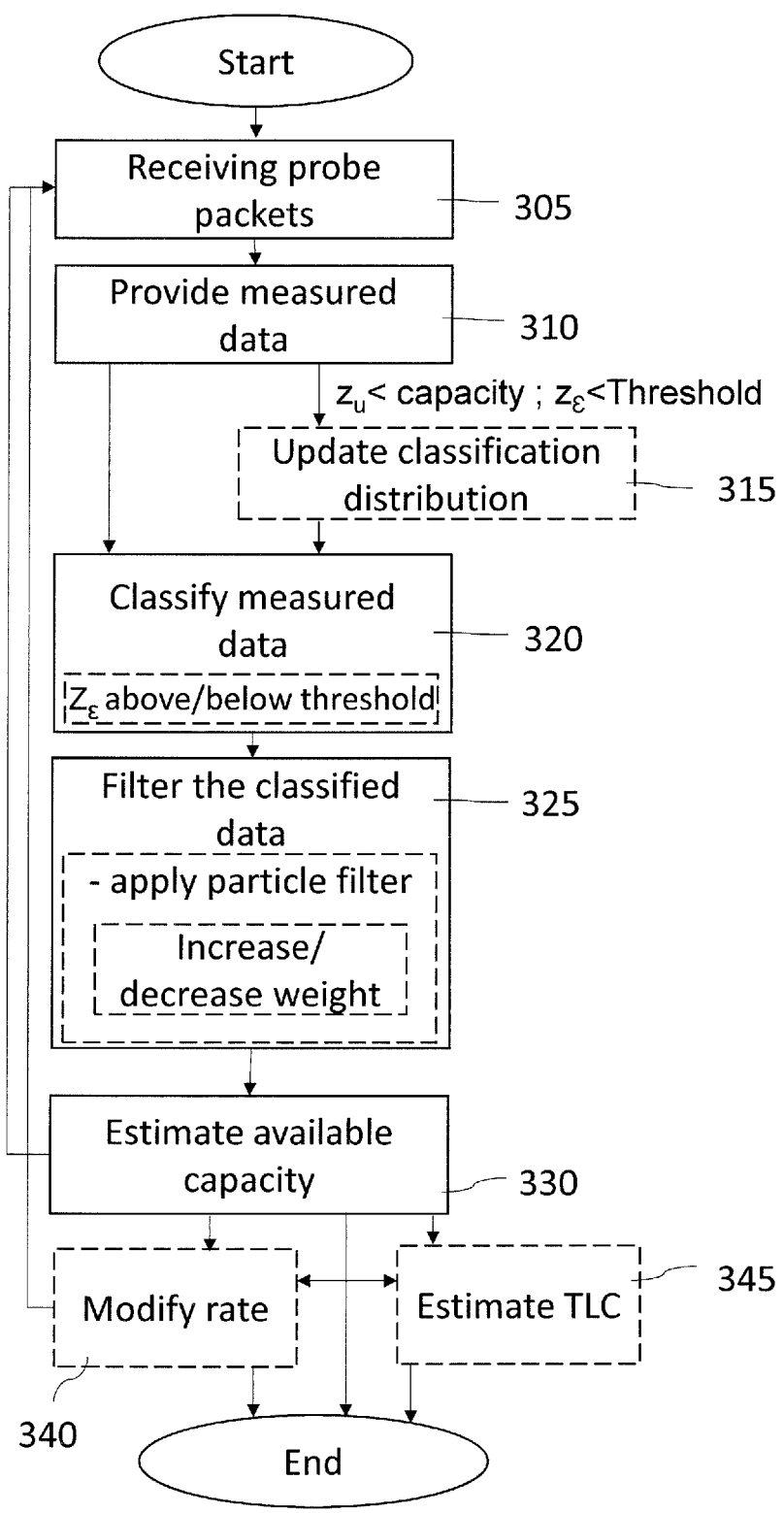
FIG. 5 is a flow diagram illustrating an embodiment of a method in a data communication system.

An overview of the entire method including classification is provided as a sequence of steps illustrated in FIG. 5. The method is performed in the apparatus 20 for estimating available capacity of the data transfer path 16 that transfers data between data communication nodes of the data communication system 10. The actions may be performed in any suitable order and action performed in some embodiments are marked with dashed boxes.

Action 305. A plurality of probe packets sent from the sender node 12 is received in the receiver node 14. Thus, the apparatus receives probe packets 15 that traverse the data transfer path 16 during real-time operation of the data transfer path 16.

Action 310. Measured data, such as rate $z_u$ and strain $z_\epsilon$, for the probe packets is provided. Thus, the measured data indicates strain of the received probe packets for use in estimating the available capacity of the data transfer path 16.

The actions 305 and 310 may be seen as a single step of sampling the data transfer path 16 in an apparatus 20 implementing the method. These actions comprise receiving the probe packets and providing measured data, such as rate $z_u$ and strain $z_\epsilon$, for the probe packets.

Action 315. The above described classification model, also referred to as classification probability density function, is updated, whereby the classification model is updated if the rate $z_u$ for the measured data is below the current estimate of available capacity. Action 315 is optional and performed in some embodiments. The apparatus 20 may thus determine that a rate $z_u$ for the measured data is below the available capacity, and a strain $z_\epsilon$ for the measured data is lower than a threshold value such as a noise distribution value. Then, the apparatus 20 updates a classification probability density function using the measured data.

Action 320. The apparatus 20 classifies the measured data based on the strain of the received probe packets. The classification may be a binary classification as described above but also other types of classification are possible. For example, probabilistic logic enables classification according to a probability function. Instead of classifying the strain as strictly zero or above zero, probabilistic logic extends the classification into zero, zero with some probability, above zero with some probability or above zero. It is clear for someone skilled in the art that different classification methodologies may affect the update functions described in the filtering step 325. The measured data, i.e. the samples, may be classified in order to decide whether the strain $z_\epsilon$ of the samples is in the zero class, i.e. $z_\epsilon=0$ in BART; or $z_\epsilon=1$ if the TOPP definition of strain is used, or in the above zero class, i.e. $z_\epsilon>0$ in BART; or $z_\epsilon>1$ if the TOPP definition of strain is used. It may be seen as a binary classification of the samples. In some embodiments the apparatus 20 determines that a strain $z_\epsilon$ for the measured data is lower than a threshold value and if so, classifies the measured data z to be zero and having a rate below the available capacity, and/or determines that the strain $z_\epsilon$ for the measured data is above a threshold value and if so, classifies the measured data z to be above zero and having a rate higher than the available capacity.

Action 325. The apparatus 20 filters the classified measured data into a discrete representation of a probability density function of available capacity. Hence, a filtering method is performed, preferably using a number of iterations of the above described method comprising some or all of the steps A-F above. The outcome of the filtering is a discrete representation of the probability density function of available capacity. The filtering may comprise applying a particle filter to the measured data. The measured data comprises the strain, $z_\epsilon$, and a rate, $z_u$, and the apparatus 20 may determine, each time a particle is selected; if strain, $z_\epsilon$, of the measured data is classified as above zero. If determined above zero, the apparatus 20 increases the value of a weight, $q_w$, for particles in a set having a rate value, $q_u$, lower than the rate, $z_u$, of the measured data, and the apparatus 20 decreases the value of a weight, $q_w$, for all particles having a rate value, $q_u$, being higher than the value of the rate, $z_u$, of the measured data. If the measured data is determined to be classified to zero; the apparatus 20 increases the value of a weight, $q_w$, for particles in a set having a rate value, $q_u$, higher than the rate, $z_u$, of the measured data, and decreases the value of a weight, $q_w$, for all particles having a rate value, $q_u$, being lower than the rate, $z_u$, of the measured data. The apparatus 20 performing estimation of available capacity using a particle filter may for each measured data, update a classification model; compare the measured data with the classification model; and use the measured data and the classification model for a weight-update process in a particle filter.

The filtering may be performed by a process comprising the steps:
i) define a particle set, S, comprising a number, P, of particles, $q_i$ where i is the particle index, each particle being a vector comprising rate u, and a weight $w_i$ denoted $q_{i,u}$ and $q_{i,w}$
  set an initial rate $q_{i,u}$ and a weight, $q_{i,w}$, for each particle, $q_i$, of the set, S,
ii) define an empty set, S', and perform P number of times:
  select a particle, $q_i$, with replacement from the particle set, S, with a probability proportional to its weight $q_{i,w}$,
  set $q_i'=q_i$
  update $q'_{i,u}$ by adding noise
  update the weight $q'_{i,w}$ based on the measured data, z, and add noise to a new weight,
  add $q_i'$ to the set, S'
iii) normalize the new weight, $q'_{i,w}$, for each particle of the set, S', and calculate a weighted average based on the updated values for the particles, $q_i'$, of the set S'; and
iv) Set S=S'

The steps i-iv may be repeated for each measured data z.

Action 330. Finally, the available capacity is estimated by using the probability density function of available capacity provided in action 325. Hence, the apparatus estimates available capacity by using the discrete representation of the probability density function.

Action 340. The apparatus 20 may then modify the rate of probe packets to be transmitted from the sender node 12 based on the estimated available capacity. For example, the apparatus 20 may modify the rate of the probe packets if the estimated available capacity is equal to the maximum or minimum send rate for the probe packets. The apparatus 20 may e.g. decrease the rate of the probe packets based on the estimated available capacity.

Action 345. The apparatus 20 may further estimate the TLC using the estimated value of available capacity and one or more values from measured data having a rate exceeding the estimated value of available capacity.

According to some embodiments herein the object to provide an accurate estimation of the available capacity of a data transfer path in real time using active probing is achieved by providing: a method of estimating available capacity of a data transfer path that transfers data between data communication nodes of a data communication system. The method comprising the steps of: receiving probe packets that traverse the data transfer path during real-time operation of the data transfer path; providing measured data for use in estimating the available capacity of the data transfer path; classifying the measured data; filtering the classified measured data and providing a probability density function of available capacity, APC; and estimating the available capacity by calculating an average value from the provided plurality of APC values.

According to one embodiment the tracking speed is increased by including a small number of particles, e.g. 10, equally spaced in the range $u_{min}$-$u_{max}$ in the particle set S' with a low and fixed weight, i.e. a weight being lower than the initial weight for the other particles in the set S'. By a fixed weight is meant that the weight will not be amended depending on the strain value of the sample z. The inclusion of these "dummy" particles may achieve that a change in available capacity can be detected faster and hence the particle filter pdf can also change faster.

Below follows a simulation using an embodiment of the method presented herein.

A number of measured data z, also called measurement samples, have been emulated to represent true APC values. The measurement samples are emulated from two different scenarios, one linear $$f(u)=\alpha u+\beta+v_k \quad \text{(eq. 10)}$$

and one non-linear $$f(u)=u^2+\beta+v_k \quad \text{(eq. 11)}$$

where $v_k$ is white noise. The measurement samples z are emulated in such a way that APC changes from 0.75, 0.5 and down to 0.25 units on average. The APC remains constant for 2000 time units before it changes.

Figure 6:
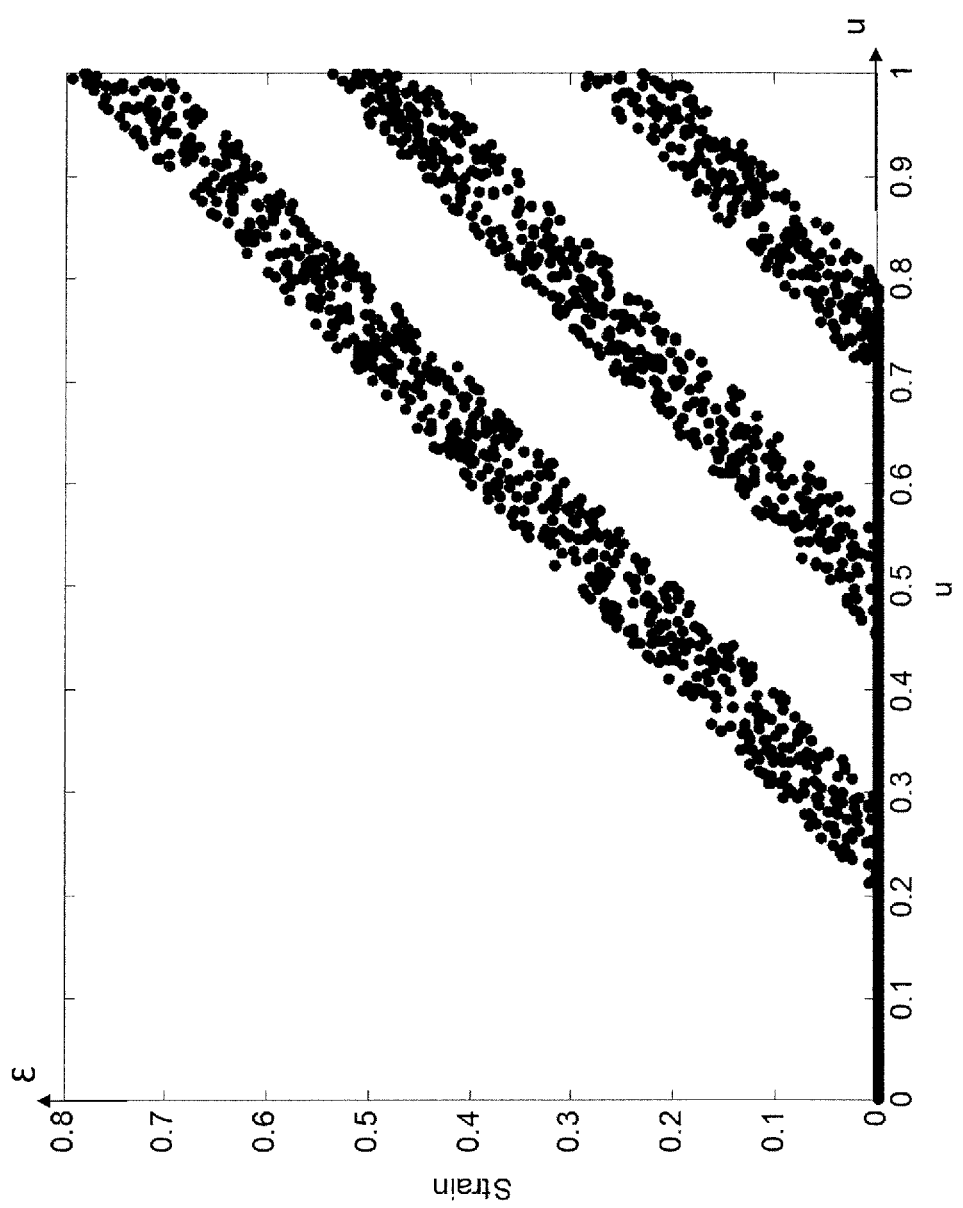
FIG. 6 illustrates an emulation of samples from a linear model for APC=0.75, 0.5 and 0.25.
Figure 7:
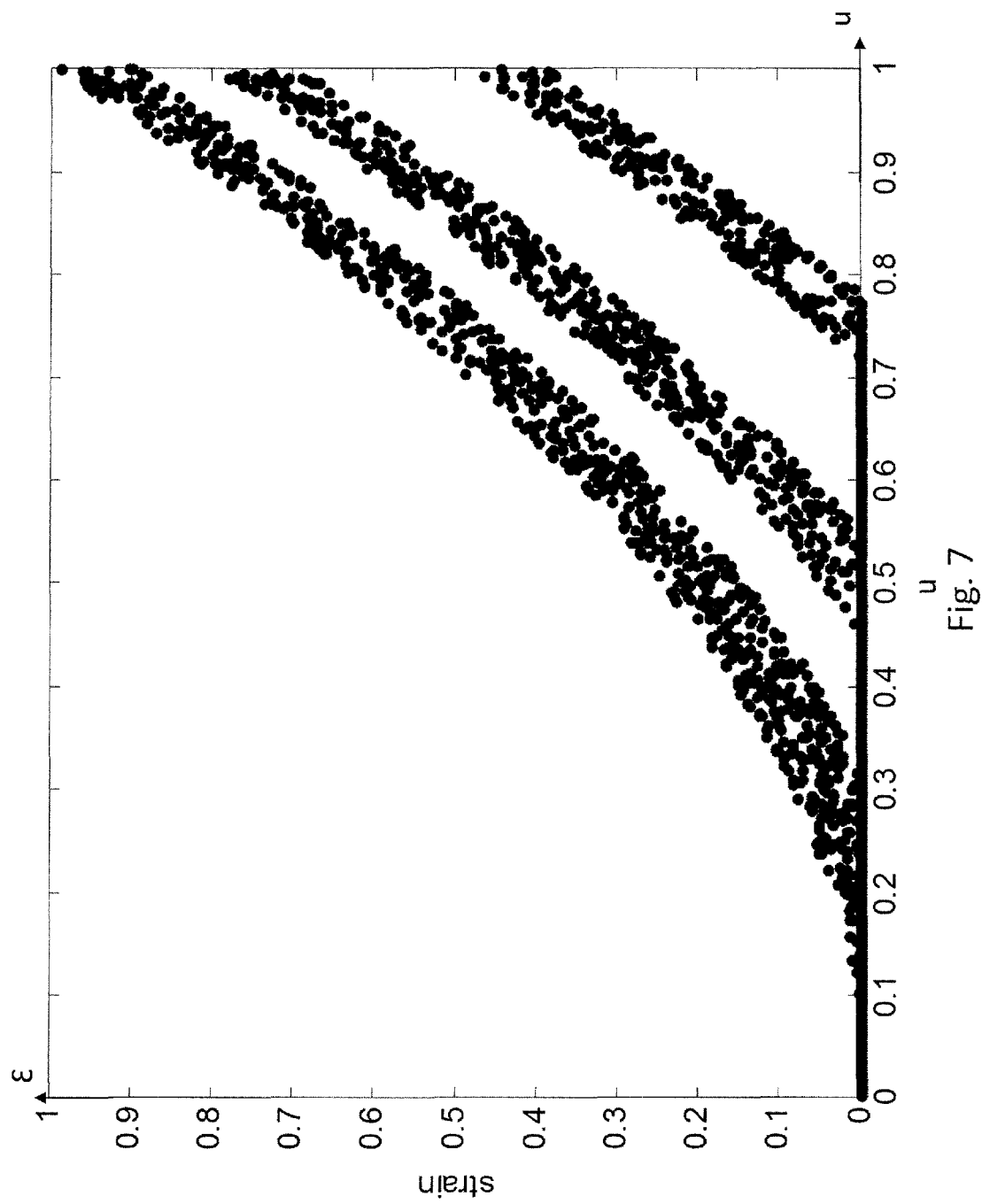
FIG. 7 illustrates an emulation of samples from a non-linear model for APC=0.75, 0.5 and 0.25.

The samples for the emulation scenarios are shown in FIG. 6 (linear) and FIG. 7 (non-linear). The probing rate is defined along a horizontal axis and the strain is defined along a vertical axis. As a reminder, the APC estimate corresponds to the intersection of e=0 for each of the three curves above zero in the two figures. As seen the available capacity e.g. the APC estimate, intersection, differs from the linear and nonlinear curves.

Figure 8:
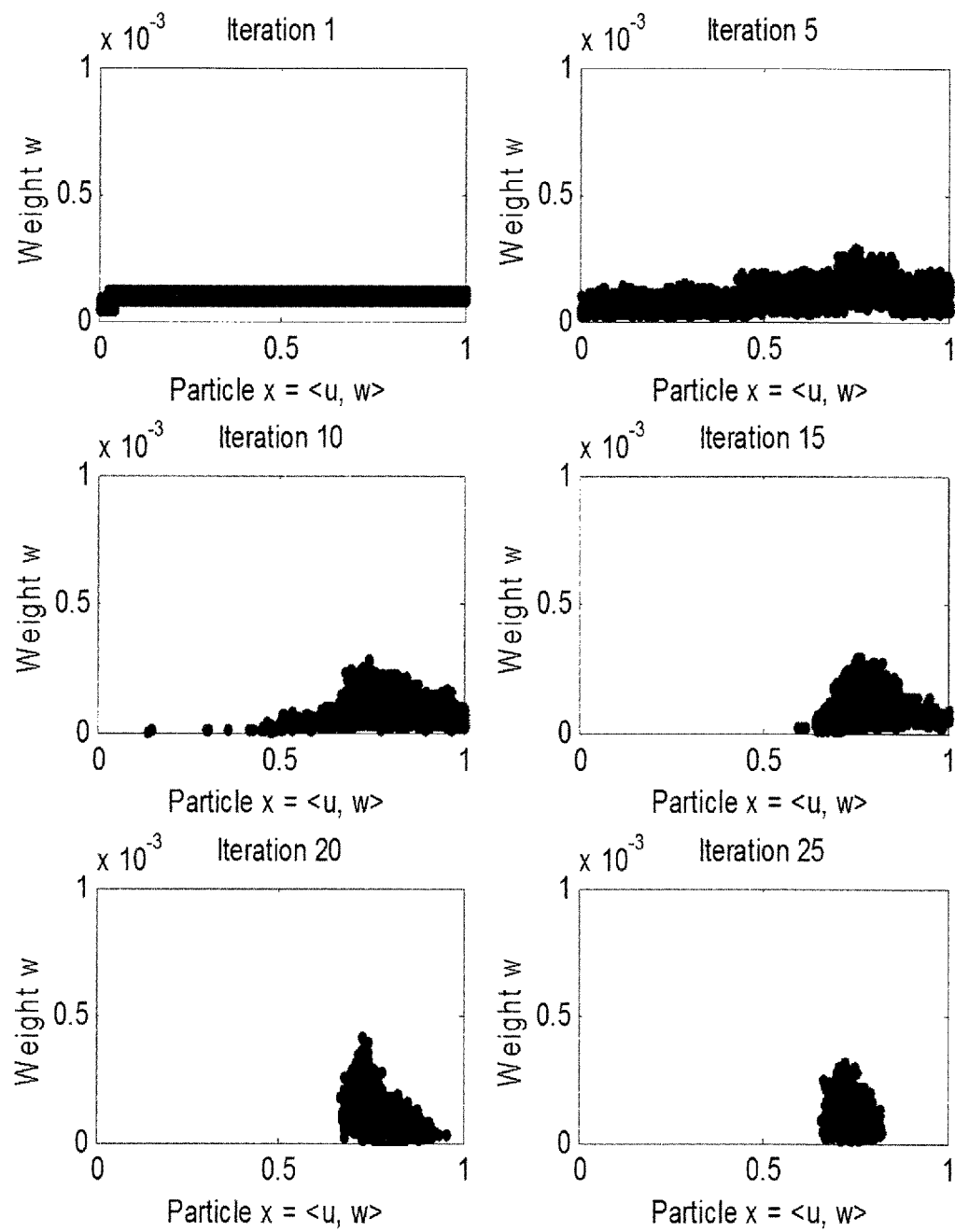
FIG. 8 illustrates estimated values for APC at different iterations using a method of the present disclosure.

In FIG. 8 the operations of a filtering method according to embodiments herein is illustrated. The FIG. 8 shows six snapshots of the distribution of the particle set. The rate is defined along a horizontal axis called u-axis and the weight is defined along a vertical axis. In this specific example the APC is constant and located at 0.75 on the u-axis. As can be seen from the evolution of the distribution of the particle set the particles gather around 0.75 after just a few iterations.

In order to compare the APC estimates with the true APC value we show two different measurement scenarios using the emulated samples described above.

Figure 9:
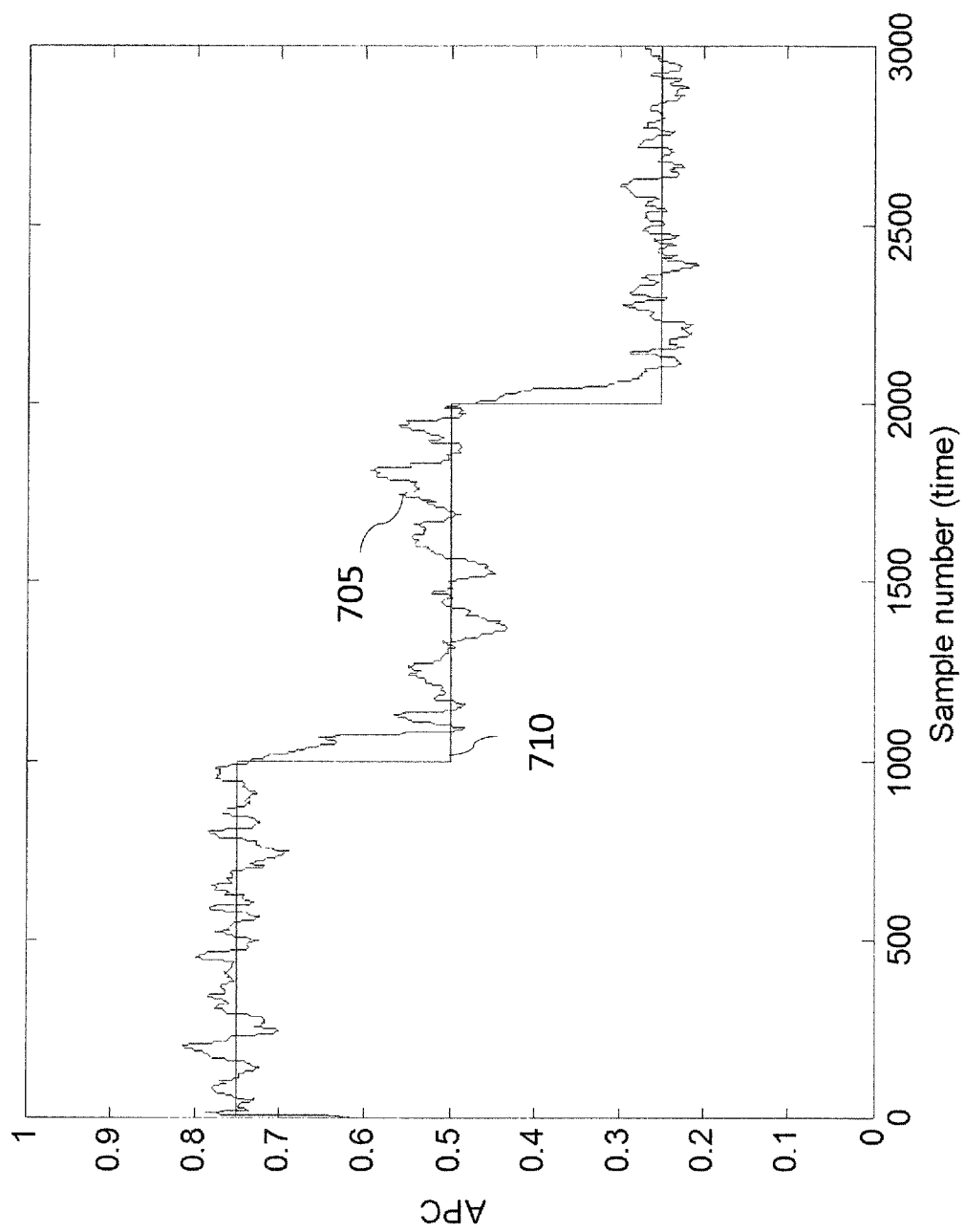
FIG. 9 illustrates values of APC estimated using a method of the present disclosure compared to actual values.

In FIG. 9 the APC estimate 705 produced by a filtering method according to embodiments herein is shown in comparison to the real APC 710 as a function of time. The sample number, or time, is defined along a horizontal axis and the APC is defined along a vertical axis. In this case the samples are emulated from a linear model. As can be seen in the figure the method produces enough accurate APC estimates and also attractive tracking properties following the changes of the APC.

Figure 10:
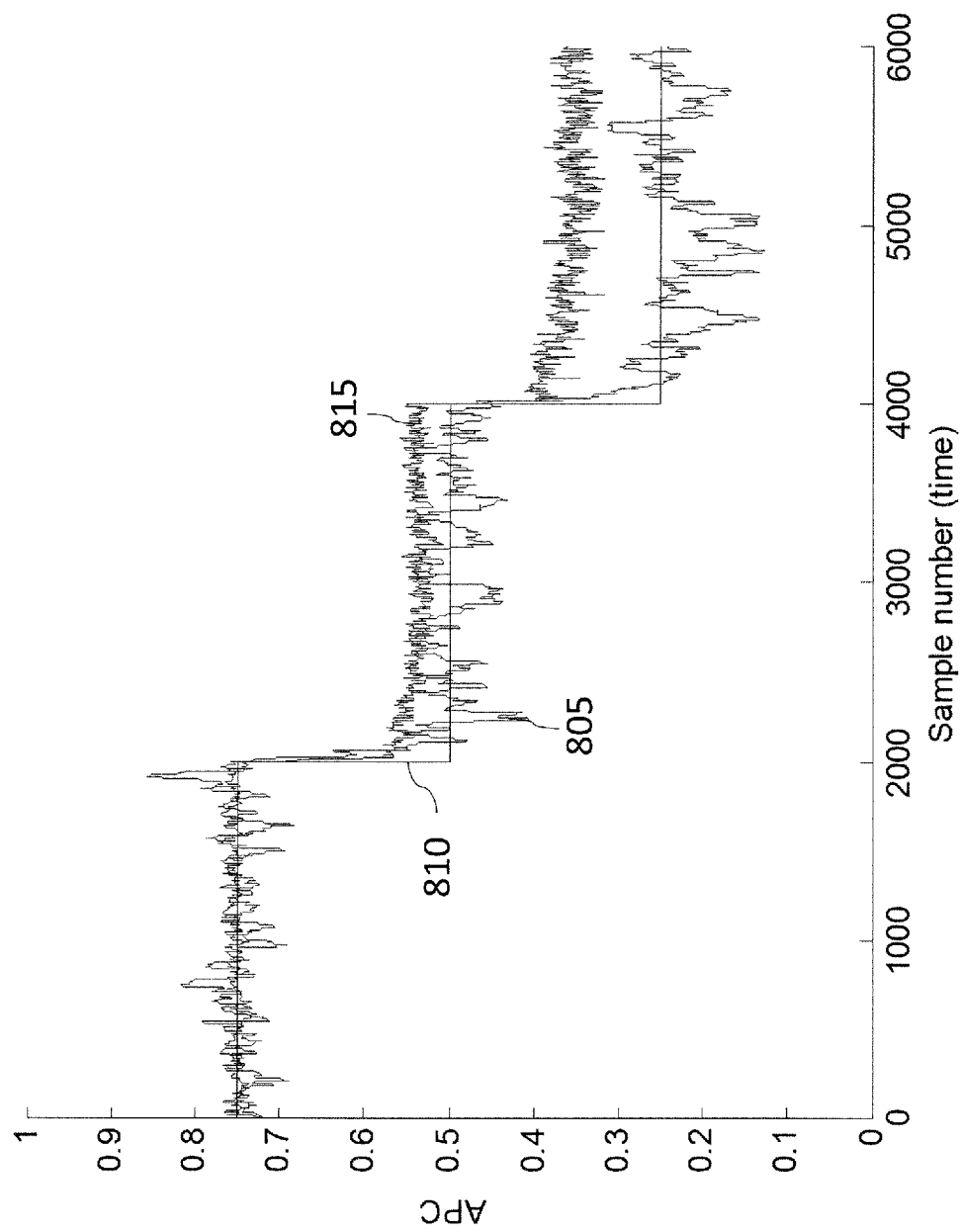
FIG. 10 illustrates values of APC estimated using a method of the present disclosure compared to actual values and values of APC estimated using a linear model.

The result shown in FIG. 10 corresponds to the case when samples are emulated using a non-linear system model. The figure illustrates three curves 805, 810, 815 as a function of time. The sample number, or time, is defined along a horizontal axis and the APC is defined along a vertical axis. The APC estimate produced by a filtering method according to embodiments herein is indicated by 805, the real or actual APC is indicated by 810 and estimates using a linear system model is indicated by 815. The herein described filtering method thus produces more accurate APC estimates and also attractive tracking properties. Although a linear model provides stable estimates and quick reaction on APC changes it may lead to a systematic overestimation as discussed above.

Figure 11:
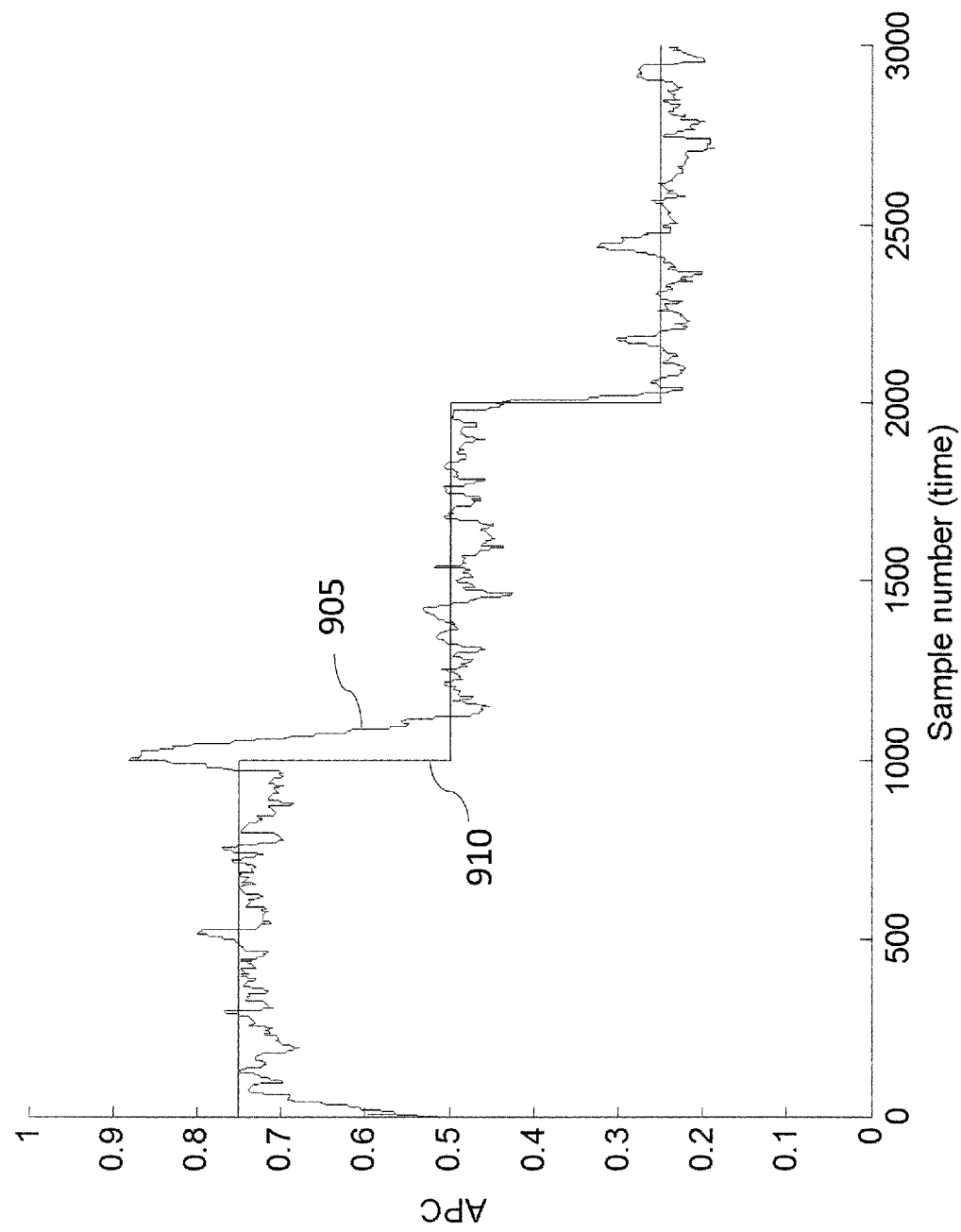
FIGS. 11 and 12 illustrate values of APC estimated using a method of the present disclosure compared to actual values in a testbed environment.
Figure 12:
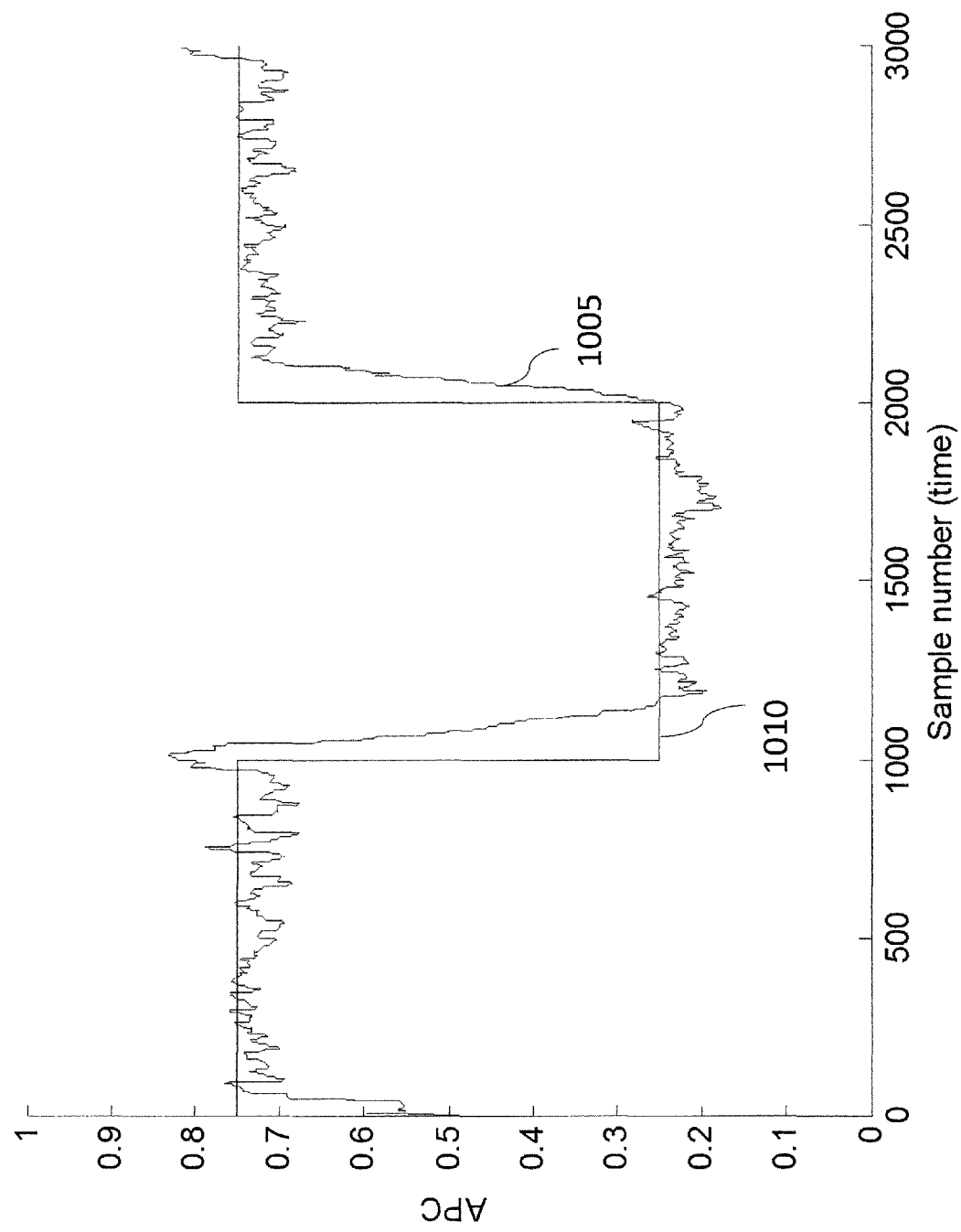

FIGS. 11 and 12 illustrate evaluation of the filtering method according to embodiments herein in a test-bed environment. Contrary to the results shown in FIGS. 9 and 10 the samples are generated in a real network. I.e. real samples are obtained from active probing of a network path as described in the introduction. The sample number, or time, is defined along a horizontal axis and the APC is defined along a vertical axis. In this test the probe-packet trains are short, exemplified as seventeen packets per train. The APC estimates provided by the disclosed filtering method are indicated by 905 and 1005 and are compared with the real APC indicated by 910 and 1010, and shows a good resemblance.

Embodiments of the present disclosure include a plurality of advantages. The described method does not require a linear model, which overcomes a potential problem with overestimation of the APC in the case of multiple bottlenecks in the network. Also, it may not be sufficient to use a linear model, it may be an oversimplification, in the APC estimation in wireless networks and when Quality of Service (QoS) technologies such as and traffic shaping are used. The method therefore provides a fast and accurate method for estimating APC for non-linear system models.

The method is further capable of estimating APC in the entire probe packet rate range [$u_{min}$, $u_{max}$]. This is not possible using methods requiring estimation of a sloping line, which then is used to estimate APC. For example, if APC=$u_{max}$ no such line can be estimated.

Further, the complexity of the method does not increase with increased complexity in f(u).

Further, the method provides a defined estimate of the APC and does not need to rely on a linear model.

A further advantage of the method is that the rate of probe packets to be transmitted from the sender node 12 can be modified based on the estimated APC. Once an estimation of the APC is provided, the rate interval [$u_{min}$, $u_{max}$] for the probe packets can thus be modified. This means that the size of the interval can be decreased, and kept small, as long as it includes the estimated APC. In this way the transmitted probe packets of a probe packet train will have a "similar" rate and consequently all probe trains will be received by the receiver node 14 within a similar time frame. Thereby the probe packets will have less impact on the traffic of the data transfer path while also the estimation of the APC will be improved.

Further, if the APC is subject to a sudden change such that the APC is outside of the maximum or minimum rate for the probe packets, the estimation of the APC will become equal to either $u_{min}$ or $u_{max}$. Accordingly, if the estimated APC is equal to $u_{min}$ the sender node 12 is instructed to modify the rate interval by at least lowering the value of $u_{min}$, but preferably also lowering the value of $u_{max}$. Correspondingly, if the estimated APC is equal to $u_{max}$ the sender node 12 is instructed to modify the rate interval by at least increasing the value to $u_{max}$, but preferably also increasing the value of $u_{min}$. I.e. if APC is estimated, by using embodiments of the present disclosure, to be equal to $u_{min}$ or $u_{max}$, this is an indication that the APC estimate may be lower or higher, respectively, than the actual APC. According to embodiments of the present disclosure, the range of the rates for the probe packets may then be extended and/or adjusted depending on the estimated APC versus the values of $u_{min}$ and/or $u_{max}$.

Figure 13:
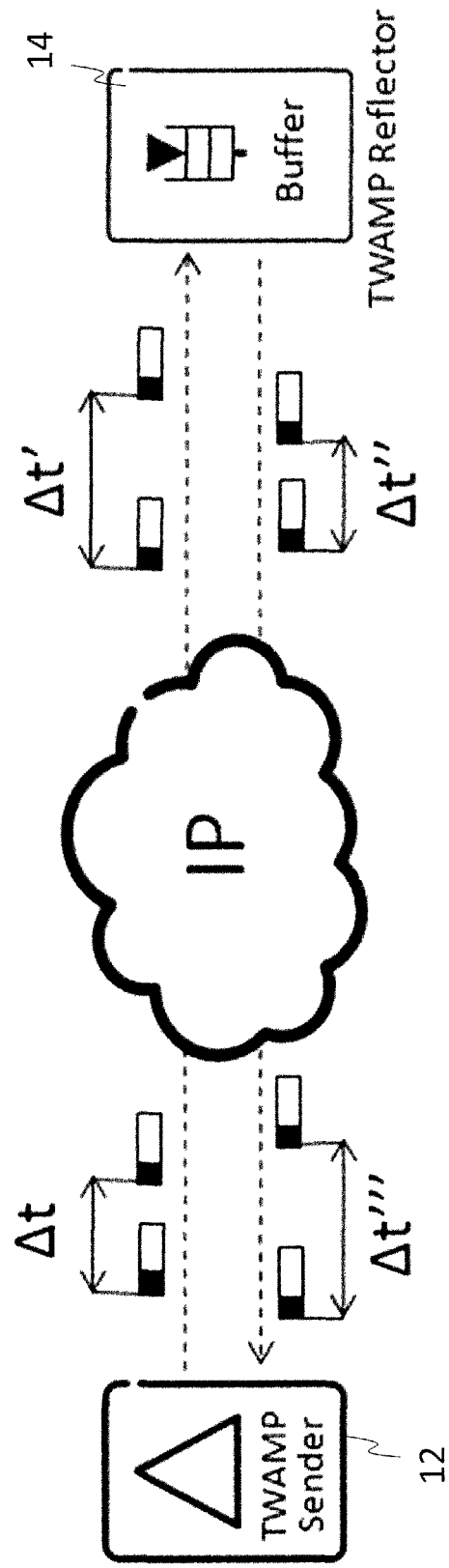
FIG. 13 is a schematic block diagram of a data transfer path of a data communication system in which embodiments of this disclosure may be implemented.

FIG. 13 is a schematic overview depicting an implementation of some embodiments herein in a TWAMP system. Herein the sender node 12 is exemplified as a TWAMP sender and the receiver node 14 is exemplified as a TWAMP reflector. The apparatus 20 described herein may be implemented in the TWAMP reflector or as a stand-alone device. As shown the sender node 12 transmits probe packets over a data transfer path with a first time interval, $\Delta t$. The probe packets transfer through the IP network and is received with a second time interval, $\Delta t'$, between the probe packets at the receiver node 14. The receiver node 14 receives and stores all probe packets in a train before sending them back to the sender node 12 as a new train with a reverse rate, which can be chosen independently of the forward rate. Thus, the receiver node 14 transmits probe packets with a third time interval, $\Delta t''$, through the IP network to the sender node 12. The sender node 12 receives the probe packets with a fourth time interval, $\Delta t'''$, between the probe packets. According to embodiments herein the apparatus 20, which may be implemented in the receiver node 14 as well as in the sender node 12 or in a stand-alone node, monitors the rates and strains and estimates available capacity over the connection in both directions.

Figure 14:
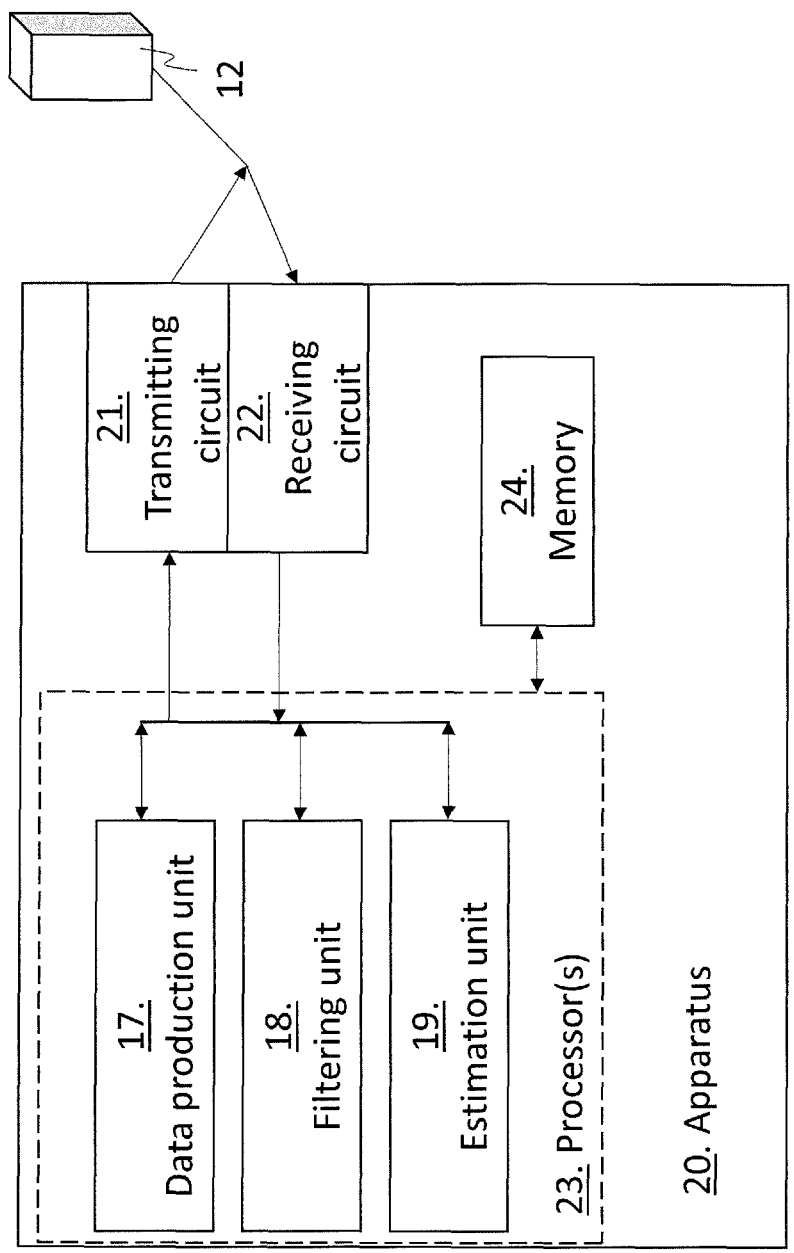
FIG. 14 is a block diagram depicting an apparatus according to embodiments herein.

The apparatus 20 of FIG. 2 is capable and configured to perform operations described above and illustrated in FIG. 5. FIG. 14 is a block diagram depicting the apparatus 20 for estimating available capacity of the data transfer path 16 that transfers data between data communication nodes of the data communication system 10.

The apparatus 20 comprises the data production unit 17 configured to receive probe packets 15 that have traversed the data transfer path 16 during real-time operation of the data transfer path 16. The data production unit 17 is responsive to traversal of the data transfer path 16 by said probe packets 15 for providing, during said real-time operation of the data transfer path 16, measured data, $z_u$, $z_\epsilon$, indicating strain of the received probe packets for use in estimating the available capacity of the data transfer path 16.

The apparatus 20 comprises the filtering unit 18 configured to classify the measured data based on the strain of the received probe packets and to filter the classified measured data into a discrete representation of a probability density function of available capacity. The filtering unit 18 may be configured to apply a particle filter to the measured data.

The measured data may comprise the strain, $z_\epsilon$, and a rate, $z_u$, and then the filtering unit 18 may be configured to, each time a particle is selected; determine if strain, $z_\epsilon$, of the measured data is classified as above zero. If above zero, the filtering unit 18 is configured to increase the value of a weight $q_w$ for particles in a set having a rate value, $q_u$, lower than the rate, $z_u$, of the measured data, and configured to decrease the value of a weight, $q_w$, for all particles having a rate value, $q_u$, being higher than the value of the rate, $z_u$, of the measured data. In some embodiments the filtering unit 18 is further configured to, each time a particle is selected; determine if the strain, $z_\epsilon$, of the measured data is classified to be zero. If zero, the filtering unit 18 is further configured to increase the value of a weight $q_w$ for particles in a set having a rate value, $q_u$, higher than the rate, $z_u$, of the measured data, and configured to decrease the value of a weight, $q_w$, for all particles having a rate value, $q_u$, being lower than the rate, $z_u$, of the measured data. The filtering unit 18 may be configured to determine that a rate $z_u$ for the measured data is below the available capacity, and a strain $z_\epsilon$ for the measured data is lower than a threshold value such as a noise distribution value; and further configured to update a classification probability density function using the measured data.

The filtering unit 18 may further be configured to classify measured data by determining that a strain $z_\epsilon$ for the measured data is lower than a threshold value such as a noise distribution value and if so, configured to classify the measured data z to be zero and to have a rate below the available capacity, and/or configured to determine that the strain $z_\epsilon$ for the measured data is above the threshold value and if so, configured to classify the measured data z to be above zero and to have a rate higher than the available capacity. The filtering unit 18 may be a particle filter configured, for each measured data, to update a classification model; to compare the measured data with the classification model; and to use the measured data and the classification model for a weight-update process in the particle filter.

The filtering unit 18 may be configured to perform the steps:
  i) define a particle set, S, comprising a number, P, of particles, $q_i$ where i is the particle index, each particle being a vector comprising rate u, and a weight w, denoted $q_{i,u}$ and $q_{i,w}$
     set an initial rate $q_{i,u}$ and a weight, $q_{i,w}$, for each particle, $q_i$, of the set, S,
  ii) define an empty set, S', and perform P number of times:
     select a particle, $q_i$, with replacement from the particle set, S, with a probability proportional to its weight $q_{i,w}$,
     set $q_i'=q_i$
     update $q'_{i,u}$ by adding noise
     update the weight $q'_{i,w}$ based on the measured data, z, and add noise to a new weight,
     add $q_i'$ to the set, S'
  iii) normalize the new weight, $q'_{i,w}$, for each particle of the set, S', and calculate a weighted average based on the updated values for the particles, $q_i'$, of the set S'; and
  iv) Set S=S'

The filtering unit 18 may then be configured to repeat steps i-iv for each measured data z.

The apparatus 20 further comprises the estimation unit 19 configured to estimate the available capacity by using the discrete representation of the probability density function.

The estimation unit 19 may further be configured to estimate the TLC using the estimated value of available capacity and one or more values from measured data having a rate exceeding the estimated value of available capacity.

The apparatus 20 may be configured to instruct the sender node 12 to modify the rate of transmitted probe packets based on the estimated available capacity. The apparatus 20 may be configured to instruct the sender node 12 to modify the rate of the probe packets if the estimated available capacity is equal to the maximum or minimum send rate for the probe packets, e.g. via a transmitting circuit 21. The apparatus 20 may e.g. be configured to instruct the sender node 12 to decrease the rate of the probe packets based on the estimated available capacity.

The apparatus may further comprise a receiving circuit 22 configured to receive the probe packets.

Thus, according to some embodiments herein an apparatus 20 is provided for estimating available path capacity, e.g. APC, in a data transfer path that transfers data between data communication nodes of a data communication system is provided. The apparatus 20 comprises data production unit configured to receive probe packets that have traversed the data transfer path during real-time operation of the data transfer path, said data production unit responsive to traversal of the data transfer path by said probe packets for providing, during said real-time operation of the data transfer path, measured data for use in estimating the APC. The apparatus 20 further comprises a filtering unit configured to classify the measured data and provide a probability density function of available capacity, APC; and an estimation unit configured to produce an estimate of the APC during said real-time operation of the data transfer path by using the probability density function provided by the filtering unit.

The embodiments herein for estimating available capacity may be implemented through one or more processors 23 in the apparatus 20 depicted in FIG. 14, together with computer program code for performing the functions and/or method actions of the embodiments herein. The program code mentioned above may also be provided as a computer program product, for instance in the form of a data carrier carrying computer program code for performing embodiments herein when being loaded into the apparatus 20. One such carrier may be in the form of a CD ROM disc. It is however feasible with other data carriers such as a memory stick. The computer program code may furthermore be provided as pure program code on a server and downloaded to the apparatus 20.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

The apparatus 20 further comprises a memory 24 the may comprise one or more memory units for storing data such as rates, strains, thresholds, noise distribution values, weights, applications to perform the methods herein, and similar.

The apparatus may e.g. be an electron device such as a standalone data communication node or be comprised in a network element, also referred to as data communication node. An electronic device, e.g., an end station, a network element, stores and transmits, internally and/or with other electronic devices over a network, code, composed of software instructions, and data using computer-readable media, such as non-transitory tangible computer-readable media, e.g., computer-readable storage media such as magnetic disks; optical disks; read only memory; flash memory devices, and transitory computer-readable transmission media, e.g., electrical, optical, acoustical or other form of propagated signals—such as carrier waves, infrared signal. In addition, such electronic devices typically include a set of one or more processors coupled to one or more other components, such as one or more non-transitory machine-readable media, to store code and/or data, user input/output devices, e.g., a keyboard, a touchscreen, and/or a display, and network connections, to transmit code and/or data using propagating signals. The coupling of the set of processors and other components is typically through one or more busses and bridges, also termed as bus controllers. Thus, a non-transitory computer-readable medium of a given electronic device typically stores instructions for execution on one or more processors of that electronic device. One or more parts of an embodiment herein be implemented using different combinations of software, firmware, and/or hardware.

As used herein, a network element, e.g., a router, switch, bridge, is a piece of networking equipment, including hardware and software, that communicatively interconnects other equipment on the network, e.g., other network elements, end stations. Some network elements are "multiple services network elements" that provide support for multiple networking functions, e.g., routing, bridging, switching, Layer 2 aggregation, session border control, Quality of Service, and/or subscriber management, and/or provide support for multiple application services, e.g., data, voice, and video. Subscriber end stations, e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes, access content/services provided over the Internet and/or content/services provided on virtual private networks (VPNs) overlaid on, e.g., tunneled through, the Internet. The content and/or services are typically provided by one or more end stations, e.g., server end stations, belonging to a service or content provider or end stations participating in a peer to peer service, and may include, for example, public webpages, e.g., free content, store fronts, search services, private webpages, e.g., username/password accessed webpages providing email services, and/or corporate networks over VPNs. Typically, subscriber end stations are coupled, e.g., through customer premise equipment coupled to an access network, wired or wirelessly, to edge network elements, which are coupled, e.g., through one or more core network elements, to other edge network elements, which are coupled to other end stations, e.g., server end stations.

Some network elements provide support for implementing VPNs e.g., Layer 2 VPNs and/or Layer 3 VPNs. For example, the network element at where a provider's network and a customer's network are coupled are respectively referred to as Provider Edges (PE) and Customer Edges (CE). In a Layer 2 VPN, forwarding typically is performed on the CE(s) on either end of the VPN and traffic is sent across the network, e.g., through one or more PEs coupled by other network elements. Layer 2 circuits are configured between the CEs and Pes, e.g., an Ethernet port, an 802.1Q permanent virtual circuit (PVC), an on-demand 802.1Q PVC, a Frame Relay PVC, an Asynchronous Transfer Mode (ATM) PVC. In a Layer 3 VPN, routing typically is performed by the PEs. By way of example, an edge network element that supports multiple contexts may be deployed as a PE; and a context may be configured with a VPN protocol, and thus that context is referred as a VPN context. Some network elements provide support for Virtual Private LAN Service (VPLS). For example, in a VPLS network, subscriber end stations access content/services provided through the VPLS network by coupling to CEs, which are coupled through PEs coupled by other network elements. VPLS networks can be used for implementing triple play network applications, e.g., data applications, e.g., high-speed Internet access, video applications, e.g., television service such as Internet Protocol Television (IPTV), Video-on-Demand (VoD) service, and voice applications, e.g., VoIP service, VPN services, etc. VPLS is a type of layer 2 VPN that can be used for multi-point connectivity. VPLS networks also allow subscriber end stations that are coupled with CEs at separate geographical locations to communicate with each other across a Wide Area Network (WAN) as if they were directly attached to each other in a Local Area Network (LAN), referred to as an emulated LAN. In VPLS networks, each CE typically attaches, possibly through an access network, wired and/or wireless, to a bridge module of a PE via an attachment circuit, e.g., a virtual link or connection between the CE and the PE. The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames, received from Ces, to destinations, e.g., other CEs, other Pes, based on the MAC destination address field included in those frames.

Typically, a network element includes a set of one or more line cards, a set of one or more control cards, and optionally a set of one or more service cards, sometimes referred to as resource cards. These cards are coupled together through one or more mechanisms, e.g., a first full mesh coupling the line cards and a second full mesh coupling all of the cards. The set of line cards make up the data plane, while the set of control cards provide the control plane and exchange packets with external network element through the line cards. The set of service cards can provide specialized processing, e.g., Layer 4 to Layer 7 services, e.g., firewall, IPsec, IDS, P2P, VoIP Session Border Controller, Mobile Wireless Gateways, GGSN, Evolved Packet System (EPS) Gateway. By way of example, a service card may be used to terminate IPsec tunnels and execute the attendant authentication and encryption algorithms.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method in an apparatus for estimating available capacity of a data transfer path that transfers data between data communication nodes of a data communication system, the method comprising:
   receiving probe packets that traverse the data transfer path during real-time operation of the data transfer path;
   providing measured data, $z_\epsilon$, indicating strain of the received probe packets for use in estimating the available capacity of the data transfer path;
   classifying the measured data based on the strain, $z_\epsilon$, of the received probe packets;
   filtering the classified measured data into a discrete representation of a probability density function of available capacity;
   estimating the available capacity by using the discrete representation of the probability density function; and
   modifying a rate of probe packets to be transmitted from the sender node based on the estimated available capacity.

2. The method of claim 1, wherein the filtering comprises applying a particle filter to the measured data.

3. The method of claim 2, wherein the measured data comprises the strain, $z_\epsilon$, and a rate, $z_u$, and wherein the method further comprises, each time a particle is selected: determining if strain, $z_\epsilon$, of the measured data is classified as above zero; if above zero, increasing the value of a weight, $q_w$, for particles in a set having a rate value, $q_u$, lower than the rate, $z_u$, of the measured data, and decreasing the value of a weight, $q_w$, for all particles having a rate value, $q_u$, being higher than the value of the rate, $z_u$, of the measured data.

4. The method of claim 2, wherein the measured data comprises the strain, $z_\epsilon$, and a rate, $z_u$, and wherein the method further comprises, each time a particle is selected: determining if the strain, $z_\epsilon$, of the measured data is classified to be zero; if zero, increasing the value of a weight, $q_w$, for particles in a set having a rate value, $q_u$, higher than the rate, $z_u$, of the measured data, and decreasing the value of a weight, $q_w$, for all particles having a rate value, $q_u$, being lower than the rate, $z_u$, of the measured data.

5. The method of claim 2, wherein the estimating and filtering comprise:
   for each measured data, updating a classification model;
   comparing the measured data with the classification model; and
   using the measured data and the classification model for a weight-update process in the particle filter.

6. The method of claim 1, further comprising:
   determining that a rate $z_u$ for the measured data is below the available capacity, and a strain $z_\epsilon$ for the measured data is lower than a threshold value; and
   updating a classification probability density function using the measured data.

7. The method of claim 1, wherein the classifying comprises determining that a strain $z_\epsilon$ for the measured data is lower than a threshold value and if so, classifying the measured data z to be zero and having a rate below the available capacity, and/or determining that the strain $z_\epsilon$ for the measured data is above a threshold value and if so, classifying the measured data z to be above zero and having a rate higher than the available capacity.

8. The method of claim 1, wherein the modifying comprises modifying the rate of the probe packets if the estimated available capacity is equal to the maximum or minimum send rate for the probe packets.

9. The method of claim 8, wherein the modifying comprises decreasing the rate of the probe packets based on the estimated available capacity.

10. The method of claim 1, further comprising estimating a tight link capacity, using the estimated value of available capacity and one or more values from measured data having a rate exceeding the estimated value of available capacity.

11. The method of claim 1 wherein the filtering comprises:
  i) defining a particle set, S, comprising a number, P, of particles, $q_i$, where i is the particle index, each particle being a vector comprising rate $u_i$ and a weight $w_i$ denoted $q_{i,u}$ and $q_{i,w}$
  setting an initial rate $q_{i,u}$ and a weight, $q_{i,w}$, for each particle, $q_i$, of the set, S,
  ii) defining an empty set, S', and performing P number of times:
  select a particle, $q_i$, with replacement from the particle set, S, with a probability proportional to its weight $q_{i,w}$,
  set $q_i' = q_i$
  update $q'_{i,u}$ by adding noise
  update the weight $q'_{i,w}$ based on the measured data, z, and add noise to a new weight,
  add $q_i'$ to the set, S'
  iii) normalizing the new weight, $q'_{i,w}$ for each particle of the set, S', and calculating a weighted average based on the updated values for the particles, $q_i'$, of the set S'; and
  iv) setting S = S'.

12. The method of claim 11, wherein steps i-iv are repeated for each measured data z.

13. An apparatus for estimating available capacity of a data transfer path that transfers data between data communication nodes of a data communication system, comprising:
  a data production unit configured to receive probe packets that have traversed the data transfer path during real-time operation of the data transfer path, said data production unit responsive to traversal of the data transfer path by said probe packets for providing, during said real-time operation of the data transfer path, measured data, $z_u$, $z_\epsilon$, indicating strain of the received probe packets for use in estimating the available capacity of the data transfer path;
  a filtering unit configured to classify the measured data based on the strain, $z_\epsilon$, of the received probe packets and to filter the classified measured data into a discrete representation of a probability density function of available capacity; and
  an estimation unit configured to estimate the available capacity by using the discrete representation of the probability density function,
  wherein the apparatus is configured to instruct a sender node to modify the rate of transmitted probe packets based on the estimated available capacity.

14. The apparatus of claim 13, wherein the filtering unit is configured to apply a particle filter to the measured data.

15. The apparatus of claim 14, wherein the measured data comprises the strain, $z_\epsilon$, and a rate, $z_u$, and wherein the filtering unit is configured to, each time a particle is selected: determine if strain, $z_\epsilon$, of the measured data is classified as above zero; if above zero, configured to increase the value of a weight $q_w$ for particles in a set having a rate value, $q_u$, lower than the rate, $z_u$, of the measured data, and configured to decrease the value of a weight, $q_w$, for all particles having a rate value, $q_u$, being higher than the value of the rate, $z_u$, of the measured data.

16. The apparatus of claim 14, wherein the measured data comprises the strain, $z_\epsilon$, and a rate, $z_u$, and wherein the filtering unit is configured to, each time a particle is selected: determine if the strain, $z_\epsilon$, of the measured data is classified to be zero; if zero, configured to increase the value of a weight $q_w$ for particles in a set having a rate value, $q_u$, higher than the rate, $z_u$, of the measured data, and configured to decrease the value of a weight, $q_w$, for all particles having a rate value, $q_u$, being lower than the rate, $z_u$, of the measured data.

17. The apparatus of claim 13, wherein the filtering unit is configured to determine that a rate $z_u$ for the measured data is below the available capacity, and a strain $z_\epsilon$ for the measured data is lower than a threshold value; and further configured to update a classification probability density function using the measured data.

18. The apparatus of claim 13, wherein the filtering unit is further configured to classify measured data by determining that a strain $z_\epsilon$ for the measured data is lower than a threshold value and if so, to classify the measured data z to be zero and to have a rate below the available capacity, and/or configured to determine that the strain $z_\epsilon$ for the measured data is above a threshold value and if so, to classify the measured data z to be above zero and to have a rate higher than the available capacity.

19. The apparatus of claim 13, wherein the filtering unit is a particle filter configured, for each measured data, to update a classification model; to compare the measured data with the classification model; and to use the measured data and the classification model for a weight-update process in the particle filter.

20. The apparatus of claim 13, wherein the apparatus is configured to instruct the sender node to modify the rate of the probe packets if the estimated available capacity is equal to the maximum or minimum send rate for the probe packets.

21. The apparatus of claim 20, wherein the apparatus is configured to instruct the sender node to decrease the rate of the probe packets based on the estimated available capacity.

22. The apparatus of claim 13, wherein the estimation unit is further configured to estimate a tight link capacity, using the estimated value of available capacity and one or more values from measured data having a rate exceeding the estimated value of available capacity.

23. The apparatus of claim 13, wherein the filtering unit is further configured to perform the steps:
  i) define a particle set, S, comprising a number, P, of particles, $q_i$ where i is the particle index, each particle being a vector comprising rate $u_i$, and a weight $w_i$ denoted $q_{i,u}$ and $q_{i,w}$
  set an initial rate $q_{i,u}$ and a weight, $q_{i,w}$, for each particle, $q_i$, of the set, S,
  ii) define an empty set, S', and perform P number of times:
  select a particle, $q_i$, with replacement from the particle set, S, with a probability proportional to its weight $q_{i,w}$,
  set $q_i' = q_i$
  update $q'_{i,u}$ by adding noise
  update the weight $q'_{i,w}$ based on the measured data, z, and add noise to a new weight,
  add $q_i'$ to the set, S'
  iii) normalize the new weight, $q'_{i,w}$, for each particle of the set, S', and calculate a weighted average based on the updated values for the particles, $q_i'$, of the set S'; and
  iv) Set S = S'.

24. The apparatus of claim 23, wherein the filtering unit is configured to repeat steps i-iv for each measured data z.

* * * * *